US 9,342,284 B2

(12) United States Patent
Hassanein et al.

(10) Patent No.: US 9,342,284 B2
(45) Date of Patent: May 17, 2016

(54) OPTIMIZATION OF INSTRUCTIONS TO REDUCE MEMORY ACCESS VIOLATIONS

(71) Applicants: Wessam M. Hassanein, San Jose, CA (US); Abhay S. Kanhere, Fremont, CA (US); Paul Caprioli, Hillsboro, OR (US)

(72) Inventors: Wessam M. Hassanein, San Jose, CA (US); Abhay S. Kanhere, Fremont, CA (US); Paul Caprioli, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/040,077

(22) Filed: Sep. 27, 2013

(65) Prior Publication Data

US 2015/0095625 A1    Apr. 2, 2015

(51) Int. Cl.
*G06F 9/44* (2006.01)
*G06F 9/45* (2006.01)
*G06F 11/36* (2006.01)
*G06F 9/30* (2006.01)

(52) U.S. Cl.
CPC .......... *G06F 8/4442* (2013.01); *G06F 9/30181* (2013.01); *G06F 11/3604* (2013.01)

(58) Field of Classification Search
CPC .............. G06F 8/4442; G06F 11/3604; G06F 11/3612; G06F 11/3636
USPC ......................................... 717/106, 126, 159
See application file for complete search history.

(56) References Cited

U.S. PATENT DOCUMENTS

| | | | | |
|---|---|---|---|---|
| 5,802,375 | A * | 9/1998 | Ngo et al. | 717/160 |
| 6,113,650 | A * | 9/2000 | Sakai | 717/160 |
| 6,134,710 | A * | 10/2000 | Levine et al. | 717/158 |
| 6,550,059 | B1 * | 4/2003 | Choe et al. | 717/159 |
| 7,921,407 | B2 * | 4/2011 | Damron et al. | 717/106 |
| 8,572,596 | B2 * | 10/2013 | Stoodley et al. | 717/159 |
| 8,732,682 | B2 * | 5/2014 | Marathe et al. | 717/141 |
| 2004/0133886 | A1 * | 7/2004 | Wu | 717/154 |
| 2014/0237460 | A1 * | 8/2014 | Schmidt | 717/160 |

OTHER PUBLICATIONS

Bocchino et al., "Vector LLVA: A Virtual Vector Instruction Set for Media Processing", ACM, 2006, 11pg.*
Dehnert et al., "The Transmeta Code Morphing TM Software: Using Speculation, Recovery, and Adaptive Retranslation to Address Real-Life Challenges", IEEE 2003, 10pg.*
Patterson et al., "Lecture 7: Vector Processing", U. C. Berkeley, 2000, 53pg.*

* cited by examiner

*Primary Examiner* — Ryan Coyer
(74) *Attorney, Agent, or Firm* — Lowenstein Sandler LLP

(57) ABSTRACT

Mechanisms for reducing memory access violations are disclosed. Sets of instructions may be identified and the identified sets of instructions may be re-translated or optimized to generate other sets of instructions. Execution of the other sets of instructions is analyzed to determine whether additional memory access violations occur. When additional memory access violations occur, further sets of instructions may be generated or re-translation/optimization of instructions may be disabled.

24 Claims, 12 Drawing Sheets

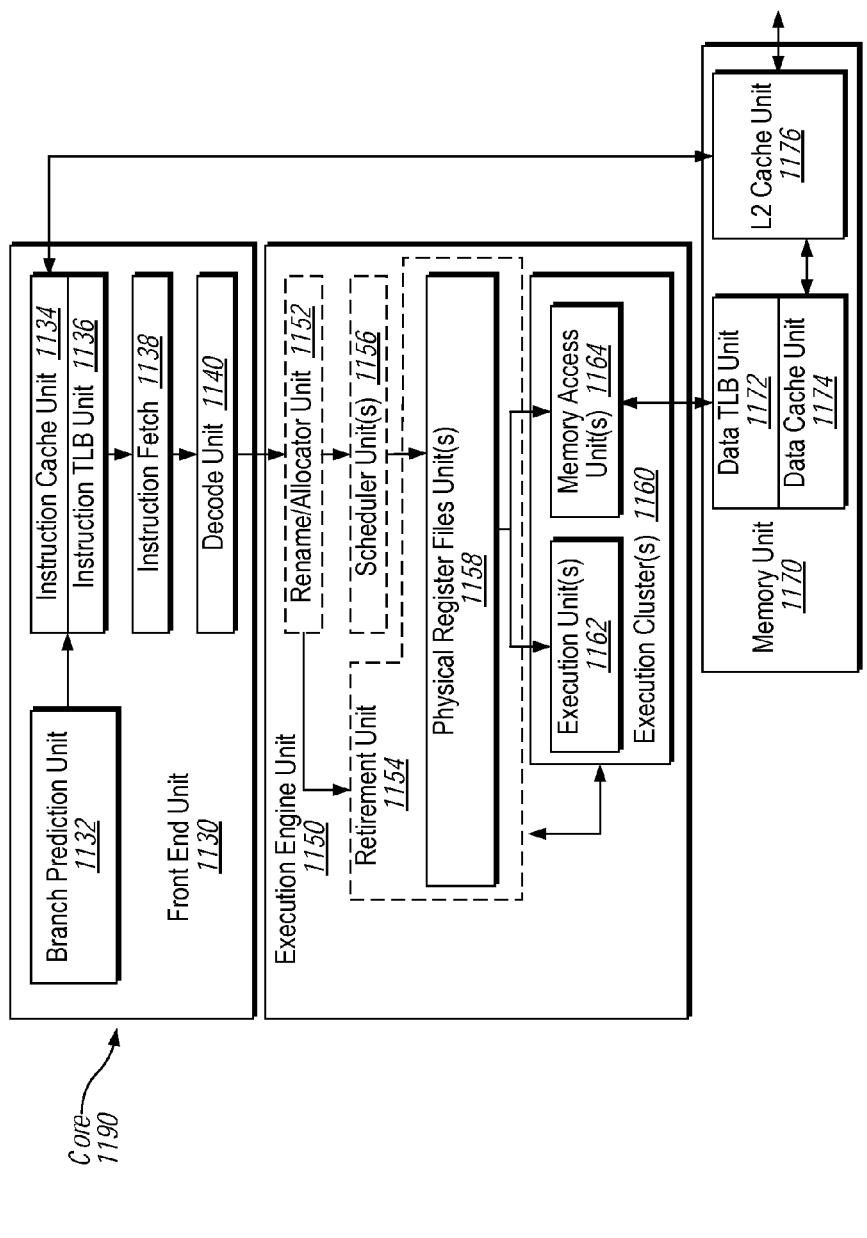
FIG. 11A
FIG. 11B

OPTIMIZATION OF INSTRUCTIONS TO REDUCE MEMORY ACCESS VIOLATIONS

TECHNICAL FIELD

Embodiments described herein generally relate to processing devices and, more specifically, relate to optimization of instructions executed by processing devices.

BACKGROUND

Processing devices access memory when performing operations and/or when executing instructions of an application. For example, a processing device may read data from a memory and/or may write data to a memory when adding two numbers (e.g., may read the two numbers from the memory and may write the result to the memory). The instructions of the application may be generated by a compiler. Some compilers may generate instructions for an application and may re-order (e.g., change the order) of the instructions. For example, the instructions of an application may initially be generated in a certain order (e.g., instruction 1, instruction 2, instruction 3, instruction 4, instruction 5, etc.). The compiler may re-order instructions in a sequence or order different from the order in which the instructions were generated (e.g., instruction 4, instruction 3, instruction 1, instruction 2, instruction 5, etc.).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 11A is a block diagram illustrating an in-order pipeline and a register renaming stage, out-of-order issue/execution pipeline implemented by a processor core, in accordance with one embodiment of the present disclosure.

FIG. 11B is a block diagram illustrating an in-order architecture core and a register renaming logic, out-of-order issue/execution logic to be included in a processor according to at least one embodiment of the disclosure.

DESCRIPTION OF EMBODIMENTS

Figure 1:
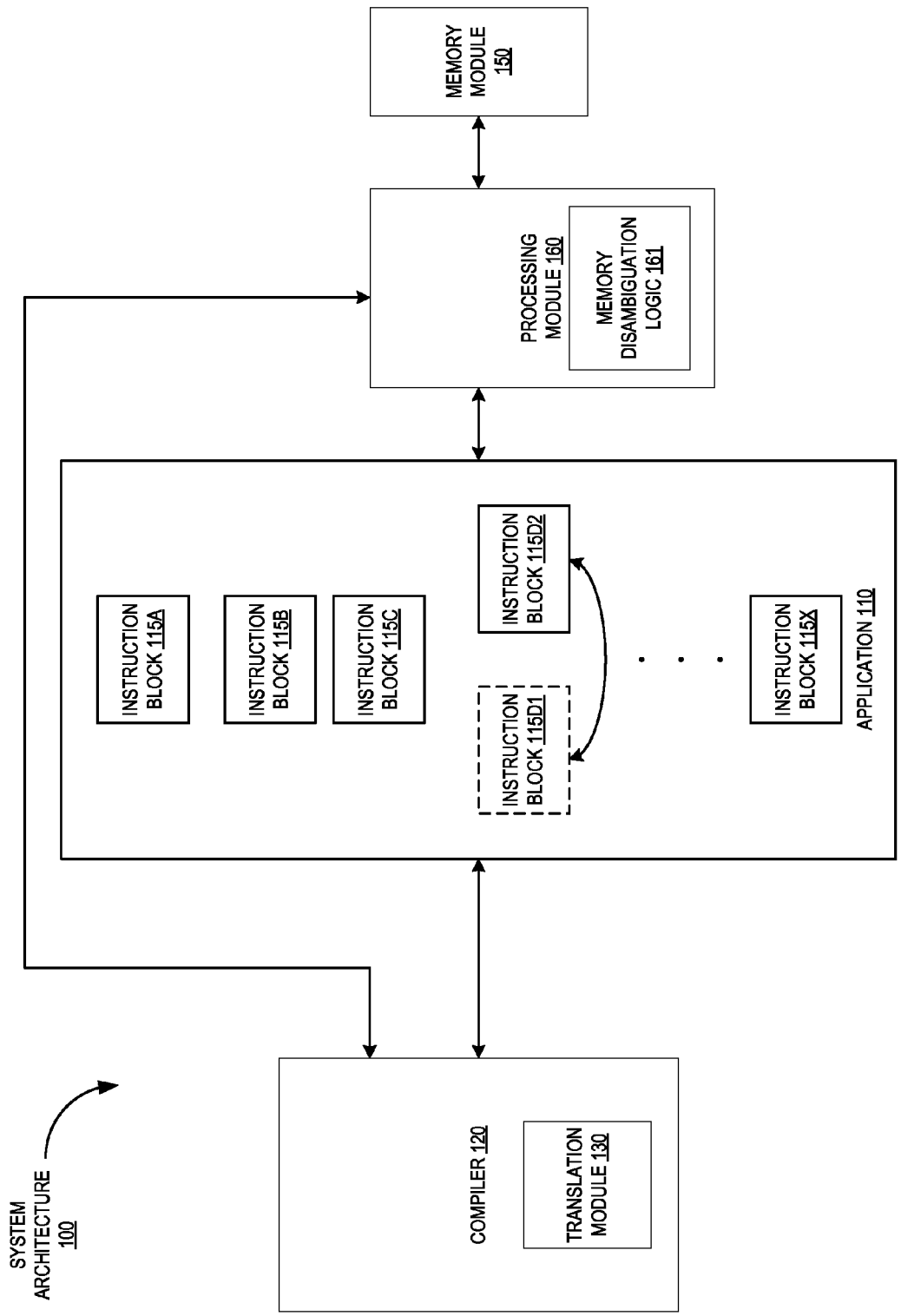
FIG. 1 is a block diagram of a system architecture including a control flow module and a tracking module for tracking the control flow of the execution of instructions in an application, according to one embodiment of the disclosure.

As discussed above, processing devices access memory when performing operations and/or when executing instructions of an application. A compiler may generate the instructions of the application and may re-order the instructions to allow a processing module to use resources (e.g., execution units, memory, etc.) more efficiently. However, re-ordering instructions may cause one or more of the instructions to access incorrect data due to the re-ordering. For example, a second instruction may use data written by a first instruction. If the second instruction is re-ordered such that the second instruction executes before the first instruction, then the second instruction may use incorrect or old data.

Embodiments of the disclosure provide for generating sets of instructions that may be optimized such that a processing module may use resources (e.g., execution units, memory, etc.) more efficiently. The sets of instructions may be in a different order than previous instructions initially generated for an application by a compiler. The sets of instructions may also include different instructions than previous instructions initially generated for an application by the compiler. The sets of instructions may include annotations indicating that the compiler and/or a translation module should perform checks to determine whether instructions in the sets of instructions access the same memory location when the instructions are executed (e.g., whether the instructions cause a memory access violation). If the instructions cause a memory access violation, a new set of instructions may be generated (e.g., the instructions may be re-optimized or retranslated) or the previous instructions initially generated by the compiler may be used. By optimizing or retranslating instructions and determining whether new sets of instructions cause memory access violations, the compiler and/or translation module can determine whether an optimization (e.g., a newly generated set of instructions) should be used. If the optimization should not be used, the compiler and/or translation module can perform a new optimization (e.g., generate another set of instructions) or disable optimizations to prevent future memory access violations. This allows the compiler and/or translation module to reduce the effects and number of memory access violations and allows the processing module (e.g., a processor) to use resources more efficiently.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

FIG. 1 is a block diagram of a system architecture 100, according to one embodiment of the disclosure. The system architecture 100 includes an application 110, a compiler 120, a translation module 130, a processing module 160, and a memory module 150.

Memory module 150 may include cache memory, registers, random access memory (RAM) and/or read-only memory (ROM) in a fixed or removable format. Other examples of memory devices may include magnetic memories such as floppy disks, hard drives, etc., electronic memories such as solid state Flash memory (e.g., eMMC, etc.), removable memory cards or sticks (e.g., USB, micro-SD, etc.), optical memories such as compact disc-based ROM (CD-ROM), holographic, etc. The memory module 150 may store information and/or data that is used during the operation of the processing module 160. For example, the memory module 150 may store numbers, values and/or other data that is used by one or more instructions of the application 110. The processing module 160 may read data from a location in the memory module (e.g., a register, a page, a block, etc.) and/or may write data to a location in the memory module.

The application 110 may be a program, a software module, a software component, and/or other software element that may be executing by the processing module 160. The application 110 may include a plurality of instructions. The instructions may include program code to cause processing module 160 to perform activities such as, but not limited to, reading data, writing data, processing data, formulating data, converting data, transforming data, etc. For example, the application 110 may be a binary file and/or an executable file that includes instructions to cause the processing module 160 to execute a media player to play media items (such as digital videos, digital music) or to cause the processing module 160 to execute a web browser. The instructions in the application 110 may be divided into blocks of instructions (e.g., a set, a series, or a group of instructions), such as instruction blocks 115A through 115X.

The instruction blocks 115A through 115X may include a variety of different instructions (e.g., program instructions). For example, the instruction blocks 115A through 115X may include an ADD instruction (to add two or more values), a MULT instruction (to multiple two or more values), an exclusive-OR (XOR) instruction (to exclusive- or two or more values), an AND instruction (to perform a bit-wise and on two or more values), a store instruction (to store a value in a memory location, such as a register), a JUMP instruction (to direct the flow of execution of the instructions to a particular instruction), a BRANCH instruction (to direct the flow of execution of the instructions to a particular instruction based on one or more conditions, etc.). In one embodiment, the one or more of the instruction blocks 115A through 115X may be atomic blocks of instructions or atomic sets of instructions. An atomic block (or an atomic set) of instructions may be a group of one or more instructions where each instruction in the atomic block/set should execute or none of the instructions in the atomic block/set are considered to have been executed.

In one embodiment, the compiler 120 may generate the instructions and/or instruction blocks 115A through 115X of the application 110 based on source code. Source code may be one or more computer instructions written using some human-readable language (e.g., a programming language, such as JAVA, C++, C, C#, etc.). The compiler 120 may be any processing logic that may comprise hardware (e.g., circuitry, dedicated logic, programmable logic, microcode, etc.), software (such as instructions run on a processing device), firmware, or a combination thereof, that may generate instructions (e.g., binary code, object code, program instructions, etc.) that can, with or without additional linkage processing, be executed by the processing module 160. In another embodiment, the compiler 120 may be a just-in-time (JIT) compiler. A JIT compiler may be a compiler that generates bytecode from source code. The bytecode may be an intermediate representation that is translated and/or interpreted by a virtual machine into instructions (e.g., binary code, object code, program instructions, etc.) that may be executed by processing module 160. The bytecode generated by a JIT compiler may be portable among different computer architectures. A virtual machine associated with each of the different computer architectures may translate and/or interpret the bytecode into instructions used by the computer architecture.

In one embodiment, the compiler 120 may be dynamic compiler. A dynamic compiler may be a compiler that generates instructions (e.g., byte code, object code, etc.) as the application 110 is executed by the processing module 160. For example, the compiler 120 may not generate instruction block 115C until that instruction block is reached by the processing module 160 while executing the application 110. In one embodiment, the compiler 120 may generate instructions (e.g., binary code, object code, program instructions, etc.) based on source code and may re-order the instructions to optimize the instructions (e.g., may perform an optimization). In one embodiment, this optimization allows the processing module 160 to execute instructions in an order based on the availability of input data, rather than in the order in which the instructions were originally generated by the compiler 120. The re-ordered instructions may allow the processing module 160 to avoid being idle while waiting for or retrieving data used by a first instruction and may execute other instructions that are ready to execute. This allows the processing module 160 to use resources (e.g., execution units) more efficiently and execute more instructions within a given period of time.

Because the order in which instructions are executed may be changed by an optimization (e.g., may be changed in a new set of instructions), two instructions that access the same memory location may execute out of order. For example, a first instruction may store data in a memory location and second instruction may read data from the same memory location. If the second instruction is re-ordered to before the first instruction, the second instruction may read incorrect data from the memory location because the first instruction has not stored the correct data in the memory location yet (due to the re-ordering). Accessing incorrect data due to re-ordering of instructions (e.g., due to out-of-order execution) may be referred to as a memory access violation. Other terms such as "alias fault" or "dependence violation" may also refer to a memory access violation.

Processing module 160 may execute instructions of the application 110. Instructions may include program code to cause processing module 160 to perform activities such as, but not limited to, reading data, writing data, processing data, formulating data, converting data, transforming data, etc. The processing module 160, as one illustrative example, may include a complex instruction set computer (CISC) microprocessor, a reduced instruction set computing (RISC) microprocessor, a very long instruction word (VLIW) microprocessor, a multi-core processor, a multithreaded processor, an ultra low voltage processor, an embedded processor, a processor implementing a combination of instruction sets, and/or any other processor device, such as a digital signal processor, for example. The processing module 160 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processing module 160 may be from another company, such as ARM Holdings, Ltd, MIPS, etc. The processing module 160 may be a special-purpose processor, such as, for example, a network or communication processor, compression engine, graphics processor, co-processor, embedded processor, an application specific integrated circuit (ASIC), a field programmable gate array (FPGA), a digital signal processor (DSP), or the like. The processing module 160 may be implemented on one or more chips. The processing module 160 may be a part of and/or may be implemented on one or more substrates using any of a number of process technologies, such as, for example, BiCMOS, CMOS, or NMOS.

In one embodiment, the processing module 160 may include memory disambiguation logic 161. Memory disambiguation logic 161 may be processing logic that may comprise hardware (e.g., circuitry, dedicated logic, programmable logic, microcode, etc.), software (such as instructions run on a processing device), firmware, or a combination thereof. In one embodiment, the memory disambiguation logic 161 may detect instructions that result in memory access violations when executed (e.g., to detect instructions that refer to the same memory location, such as a register, during execution). When a memory access violation is detected, the processing module 160 may send a message, signal, data and/or other information to the translation module 130 (and/or compiler 120) to indicate that one or more memory access violations occurred when executing instructions. The memory disambiguation logic 161 may also identify the instructions (e.g., may provide the instruction address) that resulted in the one or more memory violations. In one embodiment, the memory disambiguation logic 161 may use a Bloom filter to determine whether instructions result in one or more memory violations. A Bloom filter may be probabilistic data structure that may be used to test whether an element is a member of a set. For example, the Bloom filter may be used to determine whether a memory location accessed by a first instruction has also been accessed by a second instruction. In one embodiment, the memory disambiguation logic 161 may incorrectly determine that instructions result in one or more memory violations due to the operation of Bloom filter. In other embodiments, the memory disambiguation logic 161 may use other methods, components, and/or operations to detect memory access violations. For example, the memory disambiguation logic 161 may check a portion of a memory address and/or a complete memory access of a memory location that is accessed by instructions.

In one embodiment, some instructions and/or instruction blocks may also include annotations and/or other data/information to indicate that the memory disambiguation logic 161 and/or the translation module 130 should check the memory locations accessed by different instructions to determine whether a memory violation will occur when the instructions are executed by the processing module 160. For example, a first instruction may include a "set" annotation (or other data/information) indicating that the memory disambiguation logic 161 and/or the translation module 130 should store and/or record the memory locations accessed (e.g., read or write access) by the first instruction. A second instruction may include a "check annotation (or other data/information) indicating that the memory disambiguation logic 161 and/or the translation module 130 should check whether the memory locations accessed by the second instruction are also accessed by another instruction. A third instruction may include a "set and check" annotation (or other data/information) to indicate that the memory disambiguation logic 161 and/or the translation module 130 should store and/or record the memory locations accessed by the third instruction and check whether memory locations accessed by the third instruction are also by another instruction. In one embodiment, the annotations may be generated by the compiler 120 and/or the translation module 130, as discussed below.

In one embodiment, the translation module 130 may be processing logic that may comprise hardware (e.g., circuitry, dedicated logic, programmable logic, microcode, etc.), software (such as instructions run on a processing device), firmware, or a combination thereof, that may generate one or more of the instructions and/or instruction blocks 115A through 115X are executed by the processing module 160. Although the translation module 130 is illustrated in FIG. 1 as part of the compiler 120, in other embodiments, the translation module 130 may be a separate module.

As discussed above, the compiler 120 may generate instructions and/or instruction blocks 115A through 115X. The translation module 130 may receive the instructions and/or instruction blocks 115A through 115X from the compiler 120. The translation module 130 may determine that instruction block 115D1 (e.g., a first set of instructions) results in one or more memory access violations when executed by the processing module 160. For example, one or more of the instructions in instruction block 115D1 may include annotations (or other data) indicating that the memory disambiguation logic should check memory locations used by the instructions to determine if multiple instructions access (e.g., read from or write to) the same memory location. Memory disambiguation logic 161 may check memory locations accessed by instructions in instruction block 115D1 and determine that one or more memory access violations occurred. The memory disambiguation logic 161 may provide data to the translation module 130 indicating that one or more memory violations have occurred. In one embodiment, the memory access violation may be false because the memory disambiguation logic 161 may use a Bloom filter and/or other components that check a portion of memory addresses rather than complete memory addresses. The memory access violation may also be false because the memory disambiguation logic 161 may incorrectly determine that a memory access violation has occurred (as discussed below in conjunction with FIGS. 2-4).

In one embodiment, the translation module 130 may generate a new instruction block 115D2 (e.g., a second set of instructions) and may replace the instruction block 115D1 with the instruction block 115D2. Generating the instruction block 115D2 may be referred to as optimizing instructions (or performing an optimization), re-translating instructions, or re-optimizing instructions. The instruction block 115D2 may be optimized to allow the processing module 160 to avoid being idle while waiting for or retrieving data used by a first instruction and may execute other instructions that are ready to execute. This allows the processing module 160 to use resources (e.g., execution units) more efficiently and execute more instructions within a given period of time. In another embodiment, the translation module 130 may also generate and/or include annotations for one or more of the instructions in the instruction block 115D2. For example, the translation module 130 may include annotations in one or more instructions in the instruction block 115D2 indicating that the memory disambiguation logic 161 should not perform a check to determine whether instructions in the instruction block 115D2 are accessing the same memory location and that the translation module 130 should perform the check instead. The processing module 160 may execute the instruction block 115D2 and the translation module 130 may determine whether the executing the instruction block 115D2 results in one or more additional memory access violations based on information received from the memory disambiguation logic 161.

If execution of instruction block 115D2 does not result in a memory access violation, the translation module 130 may keep instruction block 115D2 as part of the application 110. For example, as discussed above, the compiler 120 may be a dynamic compiler which generates instructions and/or instruction blocks 115A through 115X as different portions of the application 110 are executed by the processing module 160. The translation module 130 may continue to generate instruction block 115D2 when the portion of the application associated with instruction block 115D1 is executed by the processing module 160. If execution of instruction block 115D2 does result in a memory access violation, the translation module 130 may replace instruction block 115D2 with instruction block 115D1 and/or may generate another instruction block (e.g., a third set of instructions) and replace instruction block 115D1 with the other instruction block based on different criteria and/or conditions, as discussed below in conjunction with FIG. 6.

In one embodiment, the translation module 130 may determine that the two instructions access the same memory location but also access mutually exclusive portions of the memory location. For example, the two instructions may access a memory location, such as a 16-byte register. The first instruction may use the first 8 bytes of the register (e.g., read data from the first 8 bytes) and the second instruction may use the second 8-bytes of the register (e.g., write data to the second 8 bytes). Although the two instructions may include a potential memory dependence (e.g., a dynamic memory dependency), the two instructions will not cause a memory access violation because they refer to different portions (e.g., the first 8 bytes and the second 8 bytes) of a memory location. The translation module 130 may generate a new set of instructions (e.g., instruction block 115D2) that access only the required portions of a memory location (as discussed below in conjunction with FIG. 2). The translation module 130 may also generate and/or include annotations indicating that the translation module 130 should check whether the new set of instructions causes one or more memory access violations when executed.

In one embodiment, the compiler 120 may generate a vector instruction from multiple instructions. For example, if there are four different load instructions that load (e.g., read) data from four different memory locations, the translation module 130 may generate a single vector instruction that specifies the four different memory locations based on the four different load instructions. A vector instruction may be an instruction that access and/or performs operations using multiple memory locations (or data elements) in one operation. Although the vector instruction has changed the order of the previous instructions (e.g., the instructions used to generate the vector instructions), the pattern or memory accesses in the vector instructions is similar or the same as the pattern of memory accesses for the previous instructions (as discussed below in conjunction with FIG. 4). The translation module 130 may also generate and/or include annotations in the vector instructions. The annotations may indicate that the translation module 130 should check the memory locations of the vector instructions to determine whether the vector instructions will result in a memory access violation. The translation module 130 may analyze the memory locations to determine whether the vector instructions result in one or more memory access violations when they are executed.

In one embodiment, the translation module 130 may determine that instructions in a previously generated set of instructions or block of instructions cause a memory access violation when they are re-ordered (as discussed below in conjunction with FIG. 3). The processing module 160 may execute a first set of instructions. The first set of instructions may include two instructions that cause a memory access violation when they are re-ordered by the compiler 120 and/or translation module 130. The translation module 130 may identify the two instructions in the first set of instructions. The translation module 130 may generate a second set of instructions but may keep the identified instructions in the same order as when they were in the first set of instructions to prevent additional memory access violations. The other instructions from the first set of instructions may be re-ordered in the second set of instructions and/or replaced with different instructions in the second set of instructions.

Figure 2:
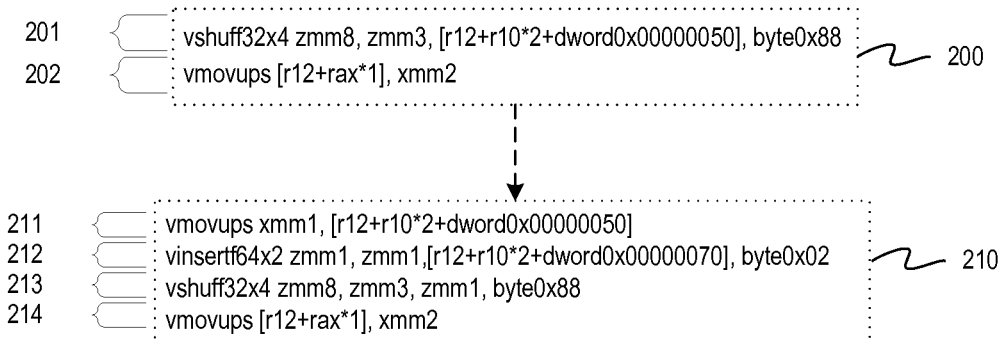
FIG. 2 is a diagram illustrating a first set of instructions of an application and a second set of instructions of an application, according to one embodiment of the disclosure.

FIG. 2 is a diagram illustrating a first set of instructions 200 of an application and a second set of instructions 210 of an application, according to one embodiment of the disclosure. As illustrated in FIG. 2, the first set of instructions 200 includes instruction 201 (e.g., a vshuff32x4 instruction) and instruction 202 (e.g., a vmovups instruction). The instruction 210 accesses a memory location that has a first memory address that is calculated as follows: r12+r10*2+dword0x00000050. The instruction 202 accesses a memory location that has a second memory address that is calculated as follows: r12+rax*1. Memory disambiguation logic 161 of a processing module (as illustrated in FIG. 1) may determine that the instructions 201 and 202 may potentially cause a memory access violation, because the first memory address and the second memory address are determined at the time the instructions execute and the two memory address may be equal (e.g., may refer to the same memory location). Thus, the memory disambiguation logic would incorrectly and/or falsely identify the first set of instructions 200 as causing a memory access violation (e.g., a false memory access violation)

Although the instructions 201 and 202 may access the same memory location (e.g., may use the same memory address), the two instructions use different chunks and/or portions of the memory location. For example, the instruction 201 accesses two 16-byte portions of the memory location and instruction 202 access another different 16-byte portion of the memory location. Because the instructions 201 and 202 access mutually exclusive portions, the accesses will not result in a memory access violation even of both instructions 201 and 202 are executed out-of-order. In one embodiment, a translation module and/or a compiler (as illustrated in FIG. 1) may generate the second set of instructions 210 based on the first set of instructions 200. The second set of instructions 210 re-translates the instruction 201 into three instructions 211, 212, and 213. The instructions 211, 212, and 213 may each access the data used in the instructions without causing memory access violations. For example, the instructions 211, 212 and 213 may access only the data used by the instructions. The instruction 214 is the same as instruction 202. In one embodiment, the translation module may also include annotations and/or other data to indicate that the translation module should check whether the instructions 211 through 214 result in a memory access violation when executed. In one embodiment, the translation module may not include annotations indicating that memory disambiguation logic (e.g., logic in a processing module, such as a processor or processing device) should check for memory access violations and/or memory dependencies.

It should be understood that the instructions illustrated in FIG. 2 are merely examples and that in other embodiments, other instructions may be used. The other instructions may use a different number of operands, may have a different order operands, may perform different operations, and may represent memory locations using different syntax, etc.

Figure 3:
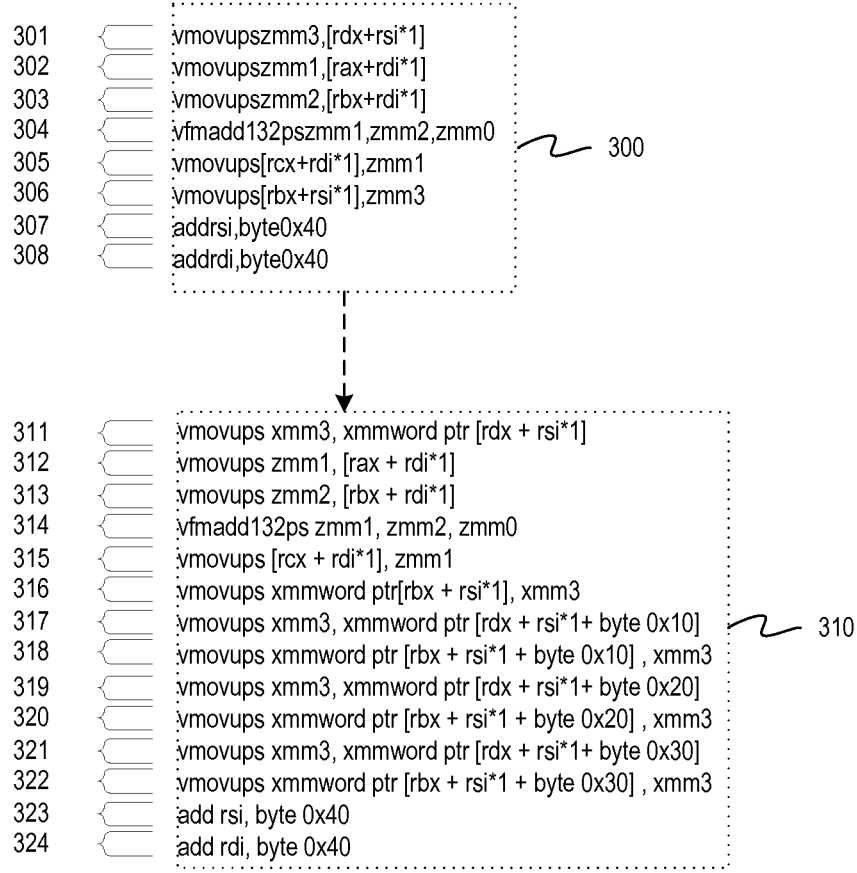
FIG. 3 is a diagram illustrating a first set of instructions of an application and a second set of instructions of an application, according to another embodiment of the disclosure.

FIG. 3 is a diagram illustrating a first set of instructions 300 of an application and a second set of instructions 310 of an application, according to another embodiment of the disclosure. As illustrated in FIG. 3, the first set of instructions 300 includes instructions 301 through 308 and the second set of instructions 310 include instructions 311 through 318. In one embodiment, a translation module (as illustrated in FIG. 1) may determine execution of the first set of instructions 300 by a processing module (e.g., a processor or a processing device) will result in a memory access violation if some of the instructions in the first set of instructions 300 are re-ordered. The translation module may determine that the memory access violation may occur because instruction 301 and instruction 306 access the same memory location. For example, the translation module may identify instruction 301 and instruction 306 as accessing the same memory location. The translation module may determine the remaining instructions 302, 303, 304, 305, 307, and 308 each do not access memory locations used by other instructions in the first set of instructions 300.

In one embodiment, the translation module may re-translate or optimize a set of instructions by converting the set of instructions into one or more vector instructions (e.g., the instructions may be vectorized), as discussed below in conjunction with FIG. 4. The re-translated or optimized instructions (e.g., the vector instructions) may cause a memory access violation. The translation module may re-translate the vector instructions back to the original set of instructions (e.g., may un-vectorize the vector instructions). For example, referring to FIG. 3, the translation module may generate the second set of instructions 310 (e.g., perform a re-translation).

In the second set of instructions 310, the instructions 301 and 306 (e.g., the vector instructions from the first set of instructions 300) are re-translated to instructions 311, 316, 317, 318, 319, 320, 321, and 322 (e.g., to the individual instructions that were previously vectorized). In particular, instruction 301 is re-translated to instructions 311, 317, 319, and 321 and instruction 306 is re-translated to instructions 316, 318, 320, and 322. Instructions 311, 317, 319, and 321 may be load instructions and instructions 316, 318, 320, and 322 may be store instructions. The instructions 311 and 316-322 of instruction set 310 are in the same order as they were before the instructions 311 and 316-322 were vectorized into instructions 301 and 306 of instruction set 300. Thus, the load instructions 311, 317, 319, and 321 and the store instructions 316, 318, 320, and 322 occur in their original order (e.g., instruction 311 is followed by instruction 316, instruction 317 is followed by instruction 318, etc.). Instructions 302, 303, 304, 305, 307, and 308 from the first set of instructions 300 remain the same as instructions 311, 312, 313, 314, 315, 323 and 324 in the second set of instructions 310.

Figure 4:
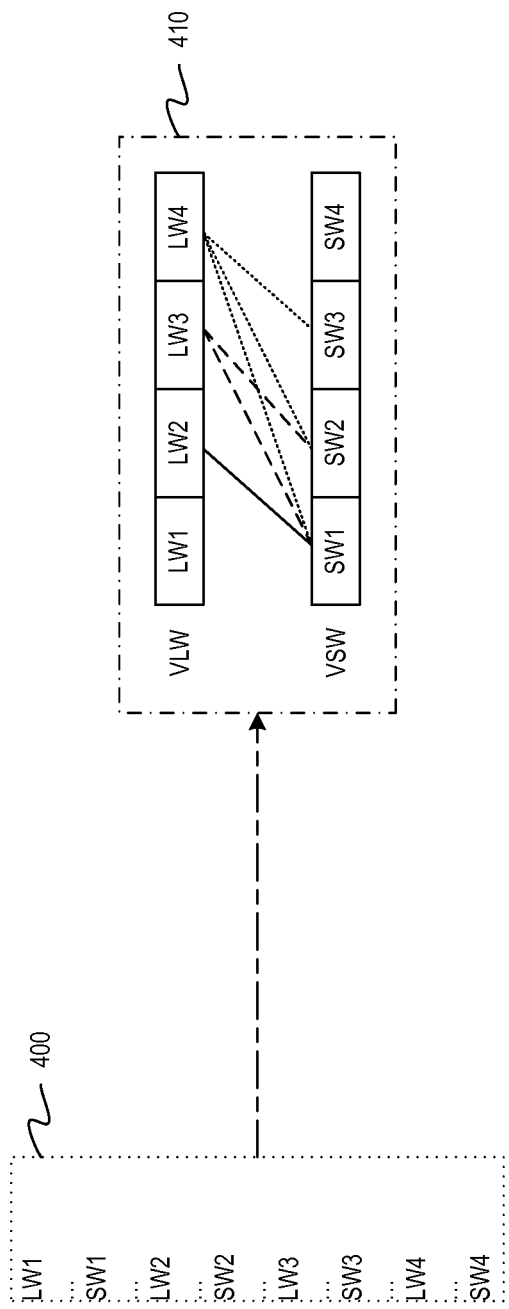
FIG. 4 is a diagram illustrating a first set of instructions of an application and a second set of instructions of an application, according to a further embodiment of the disclosure.

FIG. 4 is a diagram illustrating a first set of instructions 400 of an application and a second set of instructions 410 of an application, according to a further embodiment of the disclosure. As illustrated in FIG. 4, the first set of instructions 400 includes four load instructions LW1, LW2, LW3, and LW4. The first set of instructions 400 also includes four store instructions SW1, SW2, SW3, and SW4.

As discussed above, a translation module may combine multiple instructions into a vector instruction. The four load instructions LW1, LW2, LW3, and LW4 may each load data from a different memory location. The four store instructions SW1, SW2, SW3, and SW4 may each store data to a different memory location. In one embodiment, the translation module may combine the four load instructions LW1, LW2, LW3, and LW4 and generate a vector load instruction (e.g., VLW) that specifies the memory locations used in the original four load instructions (e.g., LW1, LW2, LW3, and LW4). The vector load instruction VLW may combine the memory locations accessed by the load instructions LW1, LW2, LW3, and LW4 into a single field or operand. For example, the vector location instruction VLW may combine the four different memory address accessed by into one single memory address. The translation module may combine the four store instructions SW1, SW2, SW3, and SW4 and generate a vector load instruction (e.g., VSW) that specifies the memory locations used in the original four load instructions (e.g., SW1, SW2, SW3, and SW4). The vector store instruction VSW may combine the memory locations accessed by the store instructions SW1, SW2, SW3, and SW4 into a single field or operand. For example, the vector store instruction VSW may combine the four different memory address accessed by into one single memory address. The vector load instruction VLW and the vector store instruction VSW are included in the second set of instructions 410. In one embodiment, the translation module may include a set annotation for the vector load instruction VLW (to indicate that the translation module should record the memory address accessed by the VLW instruction) and a check annotation for the vector store instruction VSW (to indicate that the translation module should check the memory address accessed by the VSW instruction against stored memory address).

By generating the vector load instruction VLW and the vector store instruction VSW, the translation module reorders some of the instructions in the first set of instruction 400. For example, as indicated by the line between LW2 and SW1 in the second set of instructions 410, the memory location of LW2 will be accessed before the memory location of SW1. As indicated by the dashed lines in the second set of instructions 410, the memory location of LW3 will be accessed before the memory location of SW1 and SW2. As indicated by the dotted lines in the second set of instructions 410, the memory location of LW4 will be accessed before the memory location of SW1, SW2, and SW3. Thus, the vector load instruction VLW and the vector store instruction VSW may result in a memory access violation when executed by the processing module.

In one embodiment, the translation module may compare the memory location of the vector load instruction VLW (e.g., the single memory address generated by combining the memory addresses of LW1, LW2, LW3, and LW3) to the memory location of the vector store instruction VSW (e.g., the single memory address generated by combining the memory addresses of SW1, SW2, SW3, and SW3) when the VSW and VLW instructions are executed. If the memory locations are the same (e.g., the addresses are equal), then translation module may determine that no memory access violation resulted from execution of the vector load instructions VLW and the vector store instruction VSW. If the memory locations are not the same (e.g., the addresses are not equal), the translation module may subtract the memory location of the vector store instruction VSW from the memory location of the vector load instruction VLW. The translation module may perform a logical AND operation on the result of the subtraction and a mask (e.g., 0Xfff, or some other mask based on the size of the data being accessed by the instruction). The translation module may compare the result of the logical AND operation with a threshold number (e.g., 64, or some other number based on the memory page sizes). If the result of the logical AND operation is greater than the threshold number, the translation module may determine that no memory access violation resulted from execution of the vector load instructions VLW and the vector store instruction VSW. If the result of the logical AND operation is less than the threshold number, the translation module may determine that a memory access violation resulted from execution of the vector load instructions VLW and the vector store instruction VSW.

Figure 5:
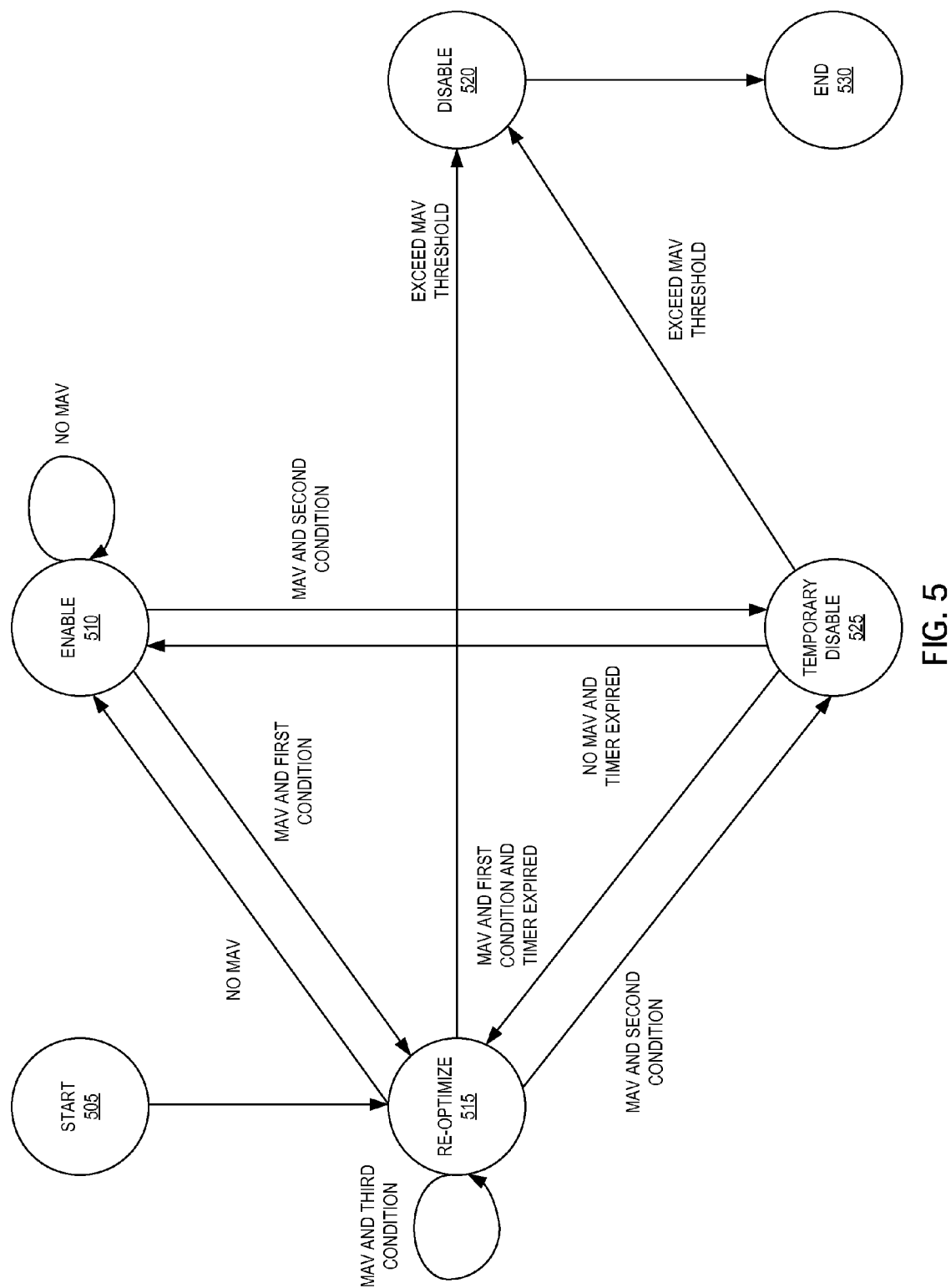
FIG. 5 is a state diagram illustrating operations performed by a translation module, according to one embodiment of the disclosure.
Figure 6:
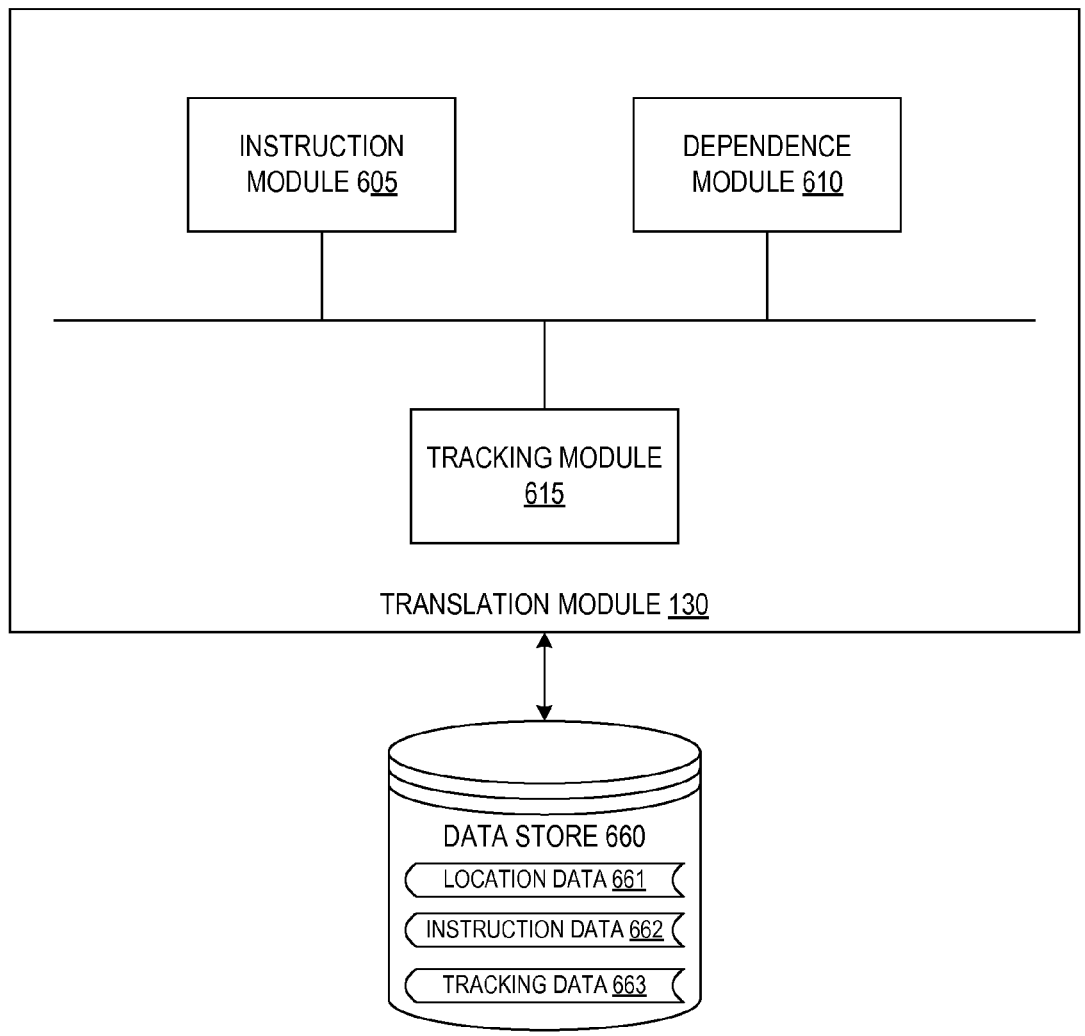
FIG. 6 is a block diagram illustrating a control flow module to generate control flow data, according to an embodiment of the disclosure.

FIG. 5 is a state diagram 500 illustrating operations performed by a translation module (as illustrated in FIGS. 1 and 6), according to one embodiment of the disclosure. The translation module may begin at the start state 505 and transition to the re-optimize state 515 where the translation module may optimize and/or re-translate instructions (e.g., generate a new set of instructions that may include instructions that are not in a previous set of instruction or may include instructions from the previous set of instructions that are out of order). If no memory access violation (MAV) results from execution of the new set of instructions, the translation module may transition to the enable state 510 where the translation module may continue to use the new set of instructions. If a MAV occurs and a third condition occurs, the translation module may generate a different set of instructions. The third condition may be satisfied if the MAV occurs for instructions that have not been previously re-translated or optimized. If a MAV occurs and a second condition is satisfied, the translation module may transition to the temporary disable state 520. The second condition may be satisfied if the set of instructions generated by the translation module includes vector instructions that access different memory locations (as illustrated in FIG. 4). If the number of MAVs that occurred exceed a threshold (e.g., any number or value indicating a maximum number of MAVs), the translation module may transition to the disable state 520. In the disable state 520, the translation module may not optimize and/or re-translate instructions (e.g., may not generate new sets of instructions that include instructions that are not in a previous set of instruction or may include instructions from the previous set of instructions that are out of order). For example, the translation module may disable all optimizations for the instructions in the application.

When the translation module transitions to the enable state 510, the translation module may continue to use the new set of instructions that were generated by the translation module. If no MAV occurs, the translation module remains in the enable state 510 where the translation module continues to use the new set of instructions (e.g., continues use the new set of instructions in the application). If a MAV occurs and a second condition is satisfied, the translation module may transition to the temporary disable state 525. If a MAV occurs and a first condition is satisfied, the translation module may transition to the re-optimize state 515. The first condition may be satisfied if the set of instructions generated by the translation module was generated because instructions from a previous set of instructions accessed the same memory location but accessed different portions of the same memory location (as illustrated in FIG. 2).

When the transition module transitions to the temporary disable state 525, the translation module may temporarily disable optimizations for the instructions in an application. The translation module may also use a timer to determine the length of time that the translation module remains in the temporary disable state 525. If a MAV occurs, the first condition is satisfied, and the timer expires, the translation module may transition back to the re-optimize state 515. If no MAV occurs and the timer expires, the translation module may transition back to the enable state 510. If additional MAVs occur and the number of MAVs that occurred exceed a threshold, the translation module transition to the disable state 520. From the disable state 520, the translation module may transition to the end state 530.

FIG. 6 is a block diagram illustrating a translation module 130, according to an embodiment of the disclosure. The translation module 130 includes an instruction module 605, a dependence module 610, and a tracking module 615. The translation module 130 may be processing logic that may comprise hardware (e.g., circuitry, dedicated logic, programmable logic, microcode, etc.), software (such as instructions run on a processing device), firmware, or a combination thereof. More or less components may be included in the translation module 130 without loss of generality. For example, two of the modules may be combined into a single module, or one of the modules may be divided into two or more modules. In one embodiment, the translation module 130 may generate set (or blocks) of instructions, may generate annotations or other data for the instructions, and/or may determine whether execution of instructions results in one or more memory access violations.

In one embodiment, the data store 660 may be may be a memory (e.g., random access memory), a cache, a drive (e.g., a hard drive), a flash drive, a database system, or another type of component or device capable of storing data. The data store 660 may also include multiple storage components (e.g., multiple drives or multiple databases) that may also span multiple computing devices (e.g., multiple server computers).

In one embodiment, the instruction module 605 may generate sets (or blocks) of instructions. For example, the instruction module 605 determine that two instructions in a first set of instructions access mutually exclusive portions of a memory location and may generate a second set of instructions, as discussed above in conjunction with FIGS. 1 and 2.

In another example, the instruction module 605 may generate determine that two instructions in a first set of instructions access the same memory location when executed and may generate a second set of instructions that includes the two instructions from the first set, as discussed above in conjunction with FIGS. 1 and 3. In a further example, the instruction module 605 may generate a set of instructions that includes one or more vector instructions based on multiple instructions from a previous set of instructions, as discussed above in conjunction with FIGS. 1 and 4. The instruction module 605 may also generated and/or include annotations (e.g., set, check, set and check, etc.) for the instructions in the sets of instructions, as discussed above in conjunction with FIGS. 1-4. In one embodiment, when an instruction with a set or a set and check annotation is executed, the memory locations accessed by the instruction may be stored in the location data 661 of the data store 650. For example, the processing module may store the memory locations in the location data 661 and may store identifier for the instructions (e.g., an instruction address or an instruction pointer) that access the memory locations. In another embodiment, the instruction module 605 may store the sets (or blocks) of instructions and/or the annotations for the instructions in the instruction data 662 of the data stores 650.

In one embodiment, the dependence module 610 may determine whether instructions that are executed by a processing module (e.g., a processor and/or processing device) result in a memory access violation. For example, an instruction may include annotations indicating that the translation module 130 should check to see whether a memory location accessed by the instruction is also accessed by another instruction that is currently executing. When the processing module executes the instruction, the processing module may provide the memory locations (e.g., memory addressed) accessed by the instruction to the translation module 130. If the dependence module 610 determines that the instruction access a memory location that is also accessed by another instruction that is currently executing, the dependence module 610 may determine that a memory access violation has occurred. The dependence module 610 may use the location data 661 when determining whether two instructions access the same memory location.

In one embodiment, the tracking module 615 may track, store, record, and/or maintain a list or a history of memory access violations and the instructions and/or instruction sets that caused the memory access violations. The list or history of memory access violations and the instructions may be stored in tracking data 663. The tracking module 615 may determine whether to re-optimize or retranslate instructions (e.g., generate a new set of instructions), disable optimizations (e.g., disable re-ordering of instructions and/or converting instructions), temporarily disable optimizations, completely disable optimizations, and/or re-enable optimizations, as discussed above in conjunction with FIG. 5.

Figure 7:
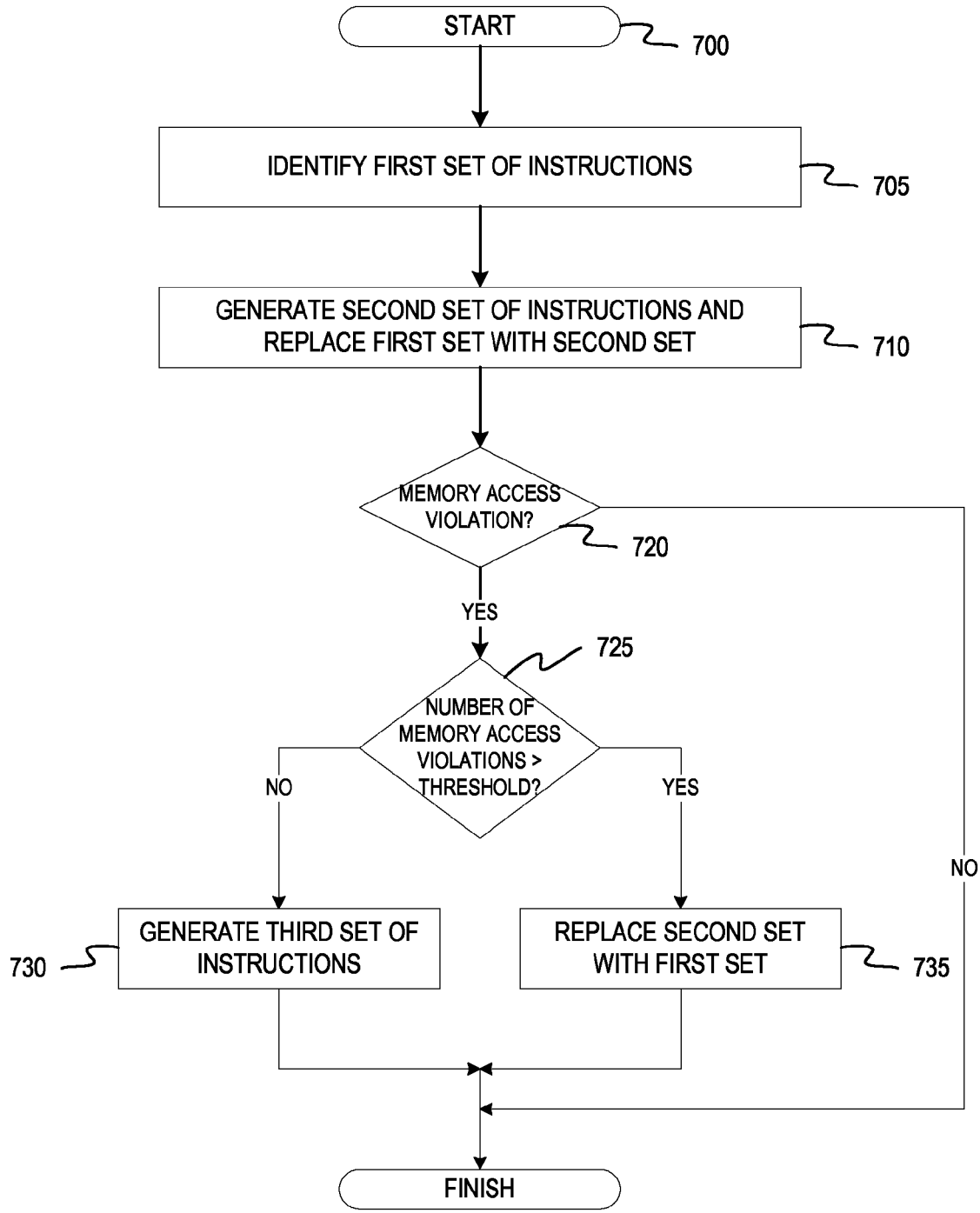
FIG. 7 is a flow diagram illustrating a method of tracking the control flow of instructions, according to one embodiment of the disclosure.

FIG. 7 is a flow diagram illustrating a method 700 of generating instructions, according to an embodiment. Method 700 may be performed by processing logic that may comprise hardware (e.g., circuitry, dedicated logic, programmable logic, microcode, etc.), software (such as instructions run on a processing device), firmware, or a combination thereof. In one embodiment, method 700 may be performed by a translation module, as illustrated in FIGS. 1 and 5.

Referring to FIG. 7, the method 700 begins at block 705 where the processing logic identifies a first set of instructions. The first set of instructions causes a first memory access violation when executed by a processing module (as discussed above in conjunction with FIGS. 1-4). At block 710, the processing logic generates a second set of instructions (e.g., retranslates or optimizes the instructions in the first set of instructions to generate the second set of instructions) and replaces the first set of instructions with the second set of instructions. The processing logic determines whether execution of the second set of instructions results in a memory access violation (block 720). If the execution of the second set of instructions does not result in a memory access violation, the method 700 ends. If the execution of the second set of instructions does result in a memory access violation, the processing logic proceeds to block 725 where the processing logic determines whether a total number of memory violations has exceeded a threshold. If the total number of memory violations has exceeded the threshold, the processing logic proceeds to block 735 where the processing logic replaces the second set of instructions with the first set of instructions (e.g., disable optimizations or retranslations). After block 735, the method 700 ends. If the total number of memory violations does not exceed the threshold, the processing logic proceeds to block 730 where the processing logic generates a third set of instructions. After block 730, the method 700 ends.

Figure 8:
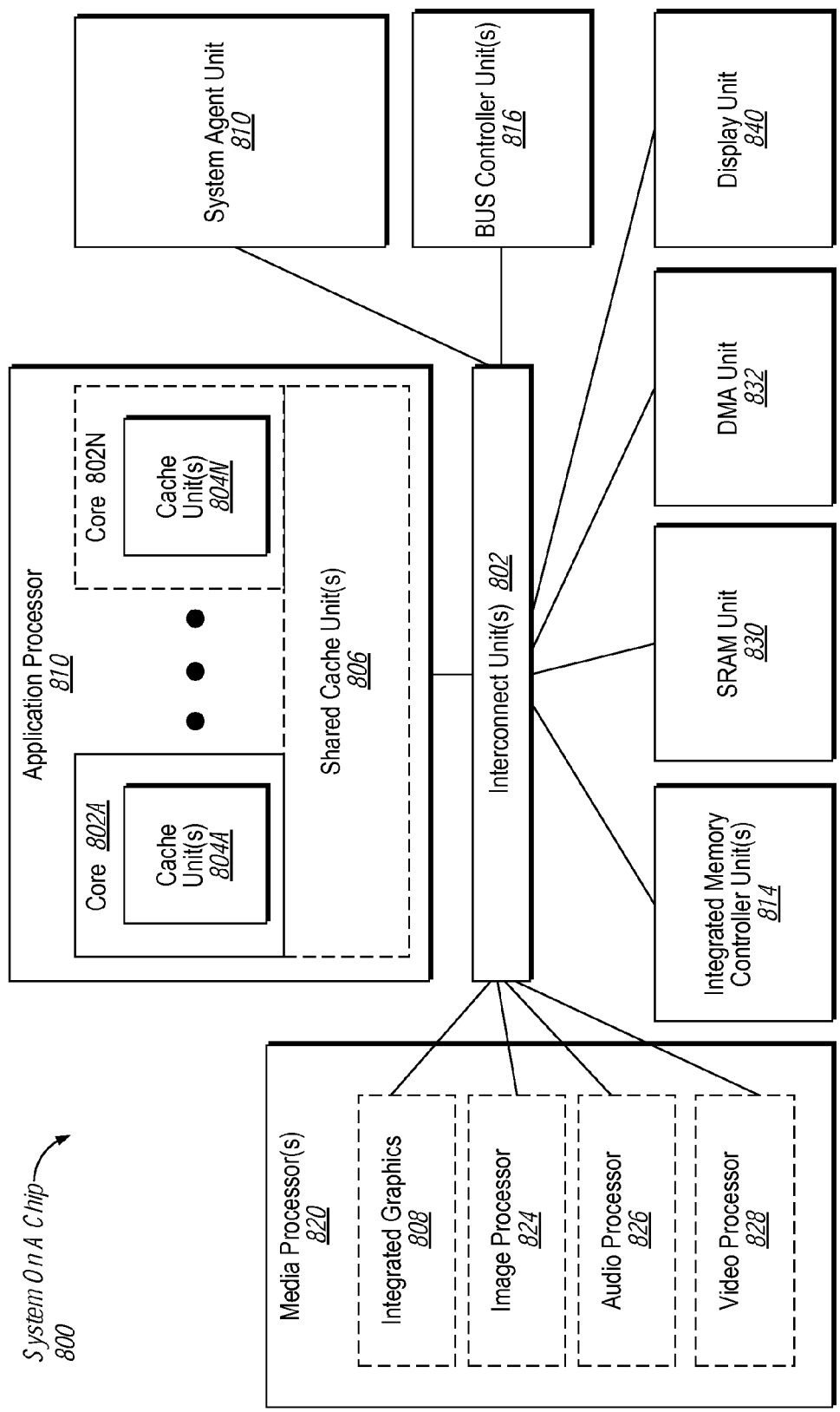
FIG. 8 is a block diagram of a system on chip (SoC), in accordance with an embodiment of the present disclosure.

FIG. 8 is a block diagram of a SoC 800 in accordance with an embodiment of the present disclosure. Dashed lined boxes are optional features on more advanced SoCs. In FIG. 8, an interconnect unit(s) 812 is coupled to: an application processor 820 which includes a set of one or more cores 802A-N and shared cache unit(s) 806; a system agent unit 810; a bus controller unit(s) 816; an integrated memory controller unit(s) 814; a set or one or more media processors 818 which may include integrated graphics logic 808, an image processor 824 for providing still and/or video camera functionality, an audio processor 826 for providing hardware audio acceleration, and a video processor 828 for providing video encode/decode acceleration; an static random access memory (SRAM) unit 830; a direct memory access (DMA) unit 832; and a display unit 840 for coupling to one or more external displays. In one embodiment, a translation module and/or compiler (as discussed in conjunction with FIGS. 1-7) may be executed by the SoC 800 to generate instructions of an application.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof.

In some embodiments, one or more of the cores 802A-N are capable of multithreading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set.

The application processor 820 may be a general-purpose processor, such as a Core™ i3, i5, i8, 2 Duo and Quad, Xeon™, Itanium™, XScale™ or StrongARM™ processor, which are available from Intel Corporation, of Santa Clara, Calif. Alternatively, the application processor 820 may be from another company, such as ARM Holdings, Ltd, MIPS, etc. The application processor 820 may be a special-purpose processor, such as, for example, a network or communication processor, compression engine, graphics processor, co-processor, embedded processor, or the like. The application processor 820 may be implemented on one or more chips. The application processor 820 may be a part of and/or may be implemented on one or more substrates using any of a number of process technologies, such as, for example, BiCMOS, CMOS, or NMOS.

Figure 9:
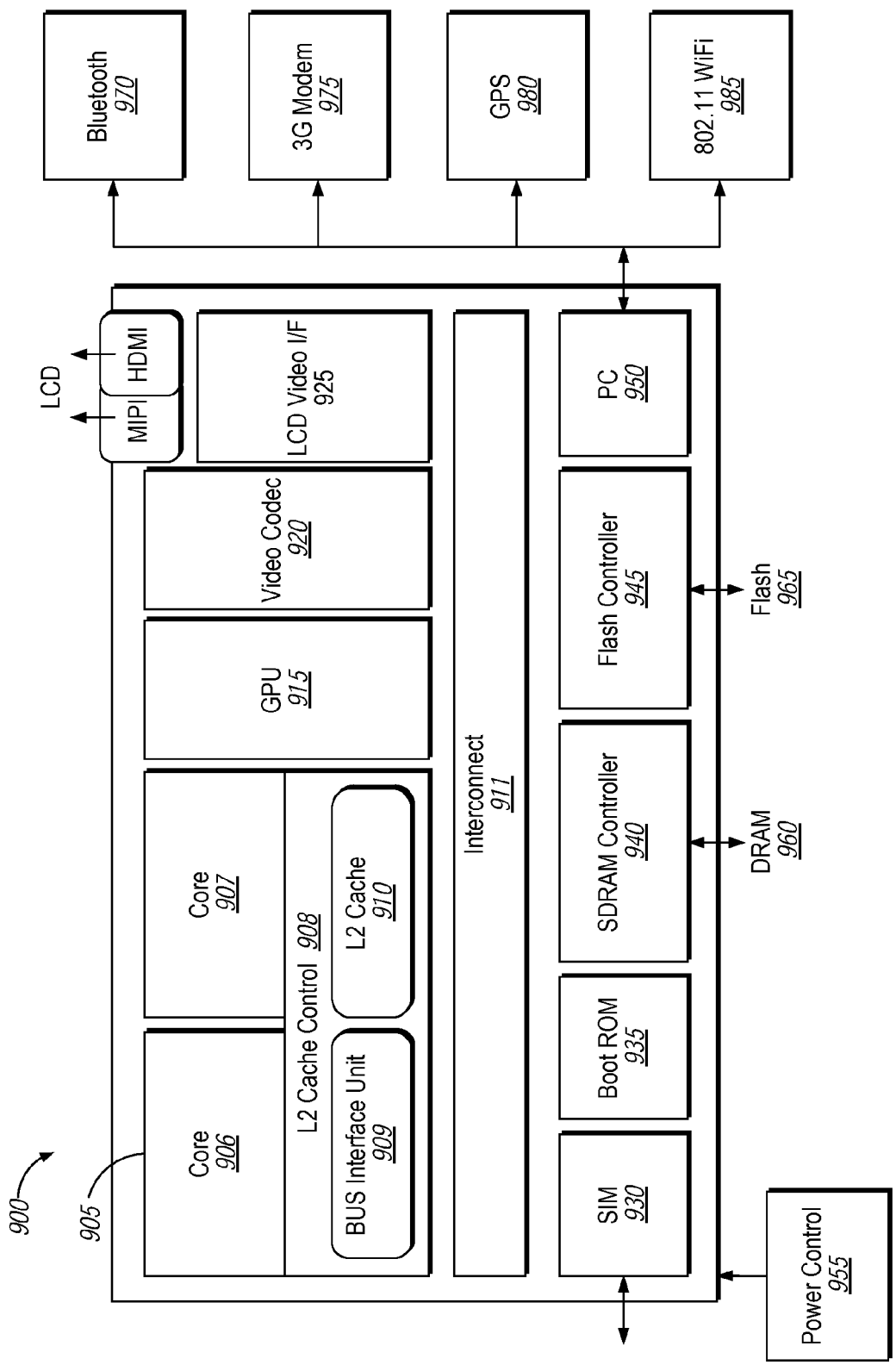
FIG. 9 is a block diagram of an embodiment of a system on-chip (SOC) design, in accordance with another embodiment of the present disclosure.

FIG. 9 is a block diagram of an embodiment of a system on-chip (SOC) design in accordance with the present disclosure. As a specific illustrative example, SOC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network. In one embodiment, a translation module and/or compiler (as discussed in conjunction with FIGS. 1-7) may be executed by the SoC 900 to generate instructions of an application.

Here, SOC 900 includes 2 cores—906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 911 includes an on-chip interconnect, such as an IOSF, AMBA, or other interconnect discussed above, which potentially implements one or more aspects of the described disclosure.

Interconnect 911 provides communication channels to the other components, such as a Subscriber Identity Module (SIM) 930 to interface with a SIM card, a boot rom 935 to hold boot code for execution by cores 906 and 907 to initialize and boot SOC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein.

In addition, the system 900 illustrates peripherals for communication, such as a Bluetooth module 970, 3G modem 975, GPS 980, and Wi-Fi 985. Note as stated above, a UE includes a radio for communication. As a result, these peripheral communication modules are not all required. However, in a UE, some form a radio for external communication is to be included.

Figure 10:
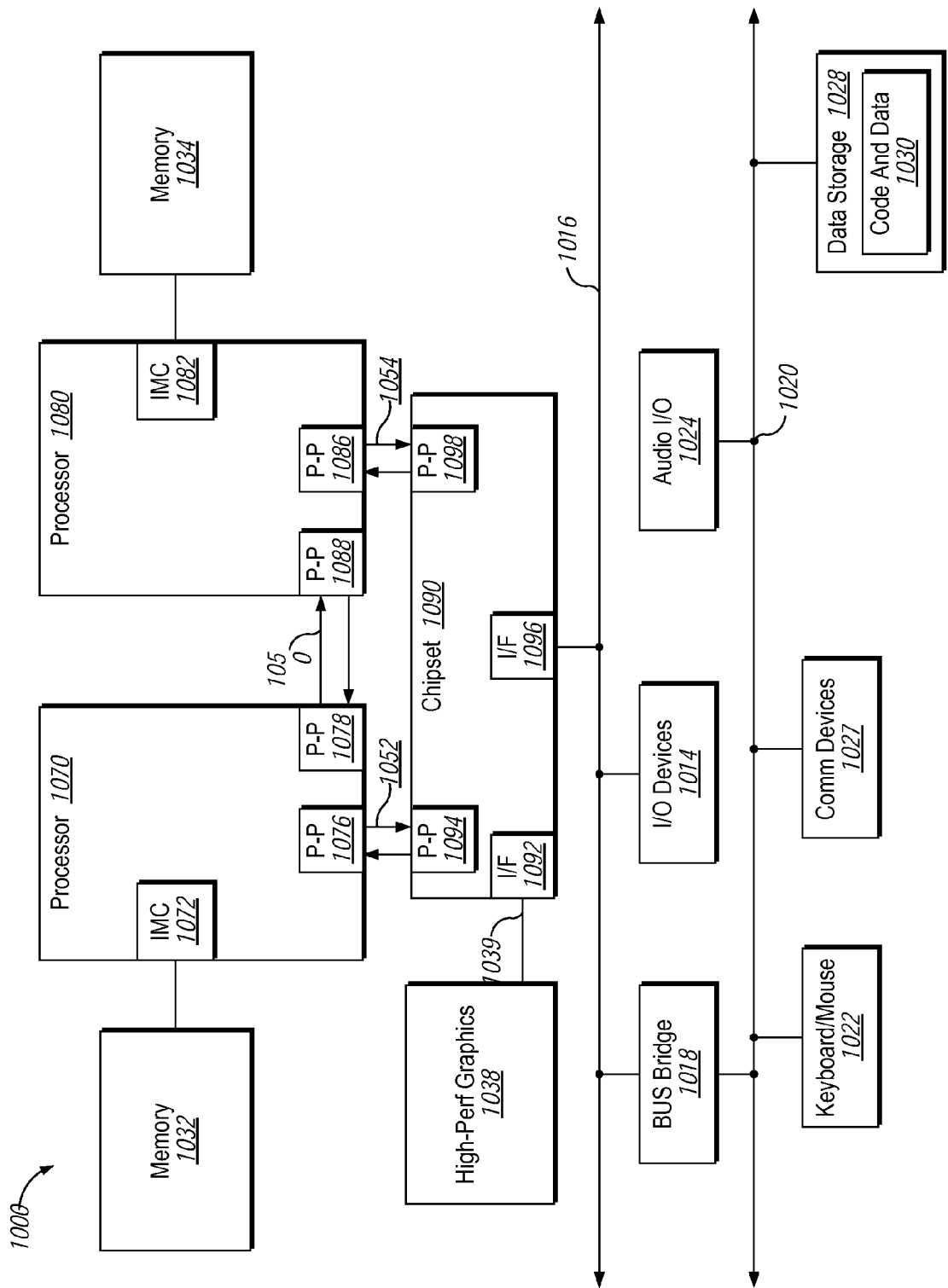
FIG. 10 is a block diagram of a computer system, according to one embodiment of the present disclosure.

FIG. 10 is a block diagram of a multiprocessor system 1000 in accordance with an implementation. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processing module 160 of FIG. 1. As shown in FIG. 10, each of processors 1070 and 1080 may be multicore processors, including first and second processor cores (i.e., processor cores 1074*a* and 1074*b* and processor cores 1084*a* and 1084*b*), although potentially many more cores may be present in the processors. A processor core may also be referred to as an execution core. The processors each may include hybrid write mode logics in accordance with an embodiment of the present. In one embodiment, a translation module and/or compiler (as discussed in conjunction with FIGS. 1-7) may be executed by one or more of the processors 1070 and 1080 to generate instructions of an application.

While shown with two processors 1070, 1080, it is to be understood that the scope of the present disclosure is not so limited. In other implementations, one or more additional processors may be present in a given processor.

Processors 1070 and 1080 are shown including integrated memory controller units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, and 1098. Chipset 1090 may also exchange information with a high-performance graphics circuit 1038 via a high-performance graphics interface 1039.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present disclosure is not so limited.

As shown in FIG. 10, various I/O devices 1014 may be coupled to first bus 1016, along with a bus bridge 1018 which couples first bus 1016 to a second bus 1020. In one embodiment, second bus 1020 may be a low pin count (LPC) bus. Various devices may be coupled to second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to second bus 1020. Note that other architectures are possible. For example, instead of the point-to-point architecture of FIG. 10, a system may implement a multi-drop bus or other such architecture.

FIG. 11A is a block diagram illustrating an in-order pipeline and a register renaming stage, out-of-order issue/execution pipeline implemented by core 1190 of FIG. 11B (which may be include in a processor). FIG. 11A is a block diagram illustrating an in-order architecture core and a register renaming logic, out-of-order issue/execution logic that may be included in a processor according to at least one embodiment of the invention. The solid lined boxes in FIG. 11A illustrate the in-order pipeline, while the dashed lined boxes illustrate the register renaming, out-of-order issue/execution pipeline. Similarly, the solid lined boxes in FIG. 11A illustrate the in-order architecture logic, while the dashed lined boxes illustrate the register renaming logic and out-of-order issue/execution logic. In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1110, an execute stage 1116, a write back/memory write stage 1118, an exception handling stage 1122, and a commit stage 1124. In one embodiment, a translation module and/or compiler (as discussed in conjunction with FIGS. 1-7) may be executed by core 1190 to generate instructions of an application.

FIG. 11B is a block diagram illustrating an in-order architecture core and a register renaming logic, out-of-order issue/execution logic that may be included in a processor according to at least one embodiment of the disclosure. In FIG. 11B, arrows denote a coupling between two or more units and the direction of the arrow indicates a direction of data flow between those units. FIG. 11B shows processor core 1190 including a front end unit 1130 coupled to an execution engine unit 1150, and both are coupled to a memory unit 1170.

The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, graphics core, or the like. In one embodiment, a translation module and/or compiler (as discussed in conjunction with FIGS. 1-7) may be executed by core 1190 to generate instructions of an application.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1134 is further coupled to a level 2 (L2) cache unit 1176 in the memory unit 1170. The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1158 is overlapped by the retirement unit 1154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1154 and the physical register file(s) unit(s) 1158 are coupled to the execution cluster(s) 1160. The execution cluster(s) 1160 includes a set of one or more execution units 162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The L2 cache unit 1176 is coupled to one or more other levels of cache and eventually to a main memory.

By way of example, the exemplary register renaming, out-of-order issue/execution core architecture may implement the pipeline 1000 as follows: 1) the instruction fetch 1138 performs the fetch and length decoding stages 1002 and 1004; 2) the decode unit 1140 performs the decode stage 1006; 3) the rename/allocator unit 1152 performs the allocation stage 1008 and renaming stage 1010; 4) the scheduler unit(s) 1156 performs the schedule stage 1012; 5) the physical register file(s) unit(s) 1158 and the memory unit 1170 perform the register read/memory read stage 1010; the execution cluster 1160 perform the execute stage 1016; 6) the memory unit 1170 and the physical register file(s) unit(s) 1158 perform the write back/memory write stage 1018; 7) various units may be involved in the exception handling stage 1022; and 8) the retirement unit 1154 and the physical register file(s) unit(s) 1158 perform the commit stage 1024.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 12:
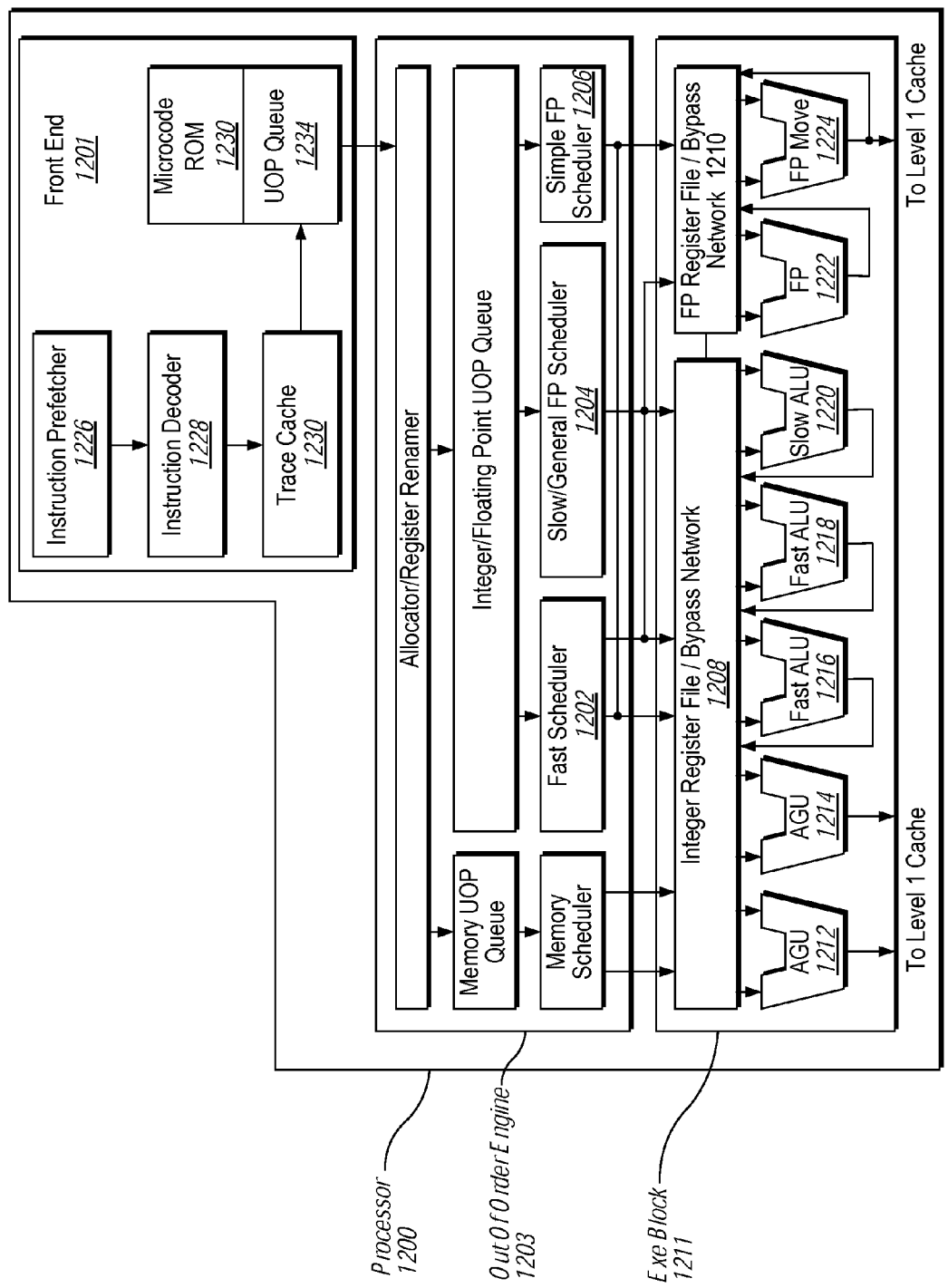
FIG. 12 is a block diagram of the micro-architecture for a processor that includes logic circuits to perform instructions, in accordance with one embodiment of the present invention.

FIG. 12 is a block diagram of the micro-architecture for a processor 1200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1201 is the part of the processor 1200 that fetches instructions to be executed and prepares them to be used later in the processor pipeline. The front end 1201 may include several units. In one embodiment, the instruction prefetcher 1226 fetches instructions from memory and feeds them to an instruction decoder 1228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1230 takes decoded uops and assembles them into program ordered sequences or traces in the uop queue 1234 for execution. When the trace cache 1230 encounters a complex instruction, the microcode ROM 1232 provides the uops needed to complete the operation. In one embodiment, a translation module and/or compiler (as discussed in conjunction with FIGS. 1-7) may be executed by processor 1200 to generate instructions of an application.

Some instructions are converted into a single micro-op, whereas others need several micro-ops to complete the full operation. In one embodiment, if more than four micro-ops are needed to complete an instruction, the decoder 1228 accesses the microcode ROM 1232 to do the instruction. For one embodiment, an instruction can be decoded into a small number of micro ops for processing at the instruction decoder 1228. In another embodiment, an instruction can be stored within the microcode ROM 1232 should a number of micro-ops be needed to accomplish the operation. The trace cache 1230 refers to an entry point programmable logic array (PLA) to determine a correct micro-instruction pointer for reading the micro-code sequences to complete one or more instructions in accordance with one embodiment from the micro-code ROM 1232. After the microcode ROM 1232 finishes sequencing micro-ops for an instruction, the front end 1201 of the machine resumes fetching micro-ops from the trace cache 1230.

The out-of-order execution engine 1203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1202, slow/general floating point scheduler 1204, and simple floating point scheduler 1206. The uop schedulers 1202, 1204, 1206, determine when a uop is ready to execute based on the readiness of their dependent input register operand sources and the availability of the execution resources the uops need to complete their operation. The fast scheduler 1202 of one embodiment can schedule on each half of the main clock cycle while the other schedulers can only schedule once per main processor clock cycle. The schedulers arbitrate for the dispatch ports to schedule uops for execution.

Register files 1208, 1210, sit between the schedulers 1202, 1204, 1206, and the execution units 1212, 1214, 1216, 1218, 1220, 1222, and 1224 in the execution block 1211. There is a separate register file 1208, 1210, for integer and floating point operations, respectively. Each register file 1208, 1210, of one embodiment also includes a bypass network that can bypass or forward just completed results that have not yet been written into the register file to new dependent uops. The integer register file 1208 and the floating point register file 1210 are also capable of communicating data with the other. For one embodiment, the integer register file 1208 is split into two separate register files, one register file for the low order 32 bits of data and a second register file for the high order 32 bits of data. The floating point register file 1210 of one embodiment has 128 bit wide entries because floating point instructions typically have operands from 64 to 128 bits in width.

The execution block 1211 contains the execution units 1212, 1214, 1216, 1218, 1220, 1222, 1224, where the instructions are actually executed. This section includes the register files 1208, 1210, that store the integer and floating point data operand values that the micro-instructions need to execute. The processor 1200 of one embodiment is comprised of a number of execution units: address generation unit (AGU) 1212, AGU 1214, fast ALU 1216, fast ALU 1218, slow ALU 1220, floating point ALU 1222, floating point move unit 1224. For one embodiment, the floating point execution blocks 1222, 1224, execute floating point, MMX, SIMD, and SSE, or other operations. The floating point ALU 1222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1216, 1218. The fast ALUs 1216, 1218, of one embodiment can execute fast operations with an effective latency of half a clock cycle. For one embodiment, most complex integer operations go to the slow ALU 1220 as the slow ALU 1220 includes integer execution hardware for long latency type of operations, such as a multiplier, shifts, flag logic, and branch processing. Memory load/store operations are executed by the AGUs 1212, 1214. For one embodiment, the integer ALUs 1216, 1218, 1220, are described in the context of performing integer operations on 64 bit data operands. In alternative embodiments, the ALUs 1216, 1218, 1220, can be implemented to support a variety of data bits including 16, 32, 128, 256, etc. Similarly, the floating point units 1222, 1224, can be implemented to support a range of operands having bits of various widths. For one embodiment, the floating point units 1222, 1224, can operate on 128 bits wide packed data operands in conjunction with SIMD and multimedia instructions.

In one embodiment, the uops schedulers 1202, 1204, 1206, dispatch dependent operations before the parent load has finished executing. As uops are speculatively scheduled and executed in processor 1200, the processor 1200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 13:
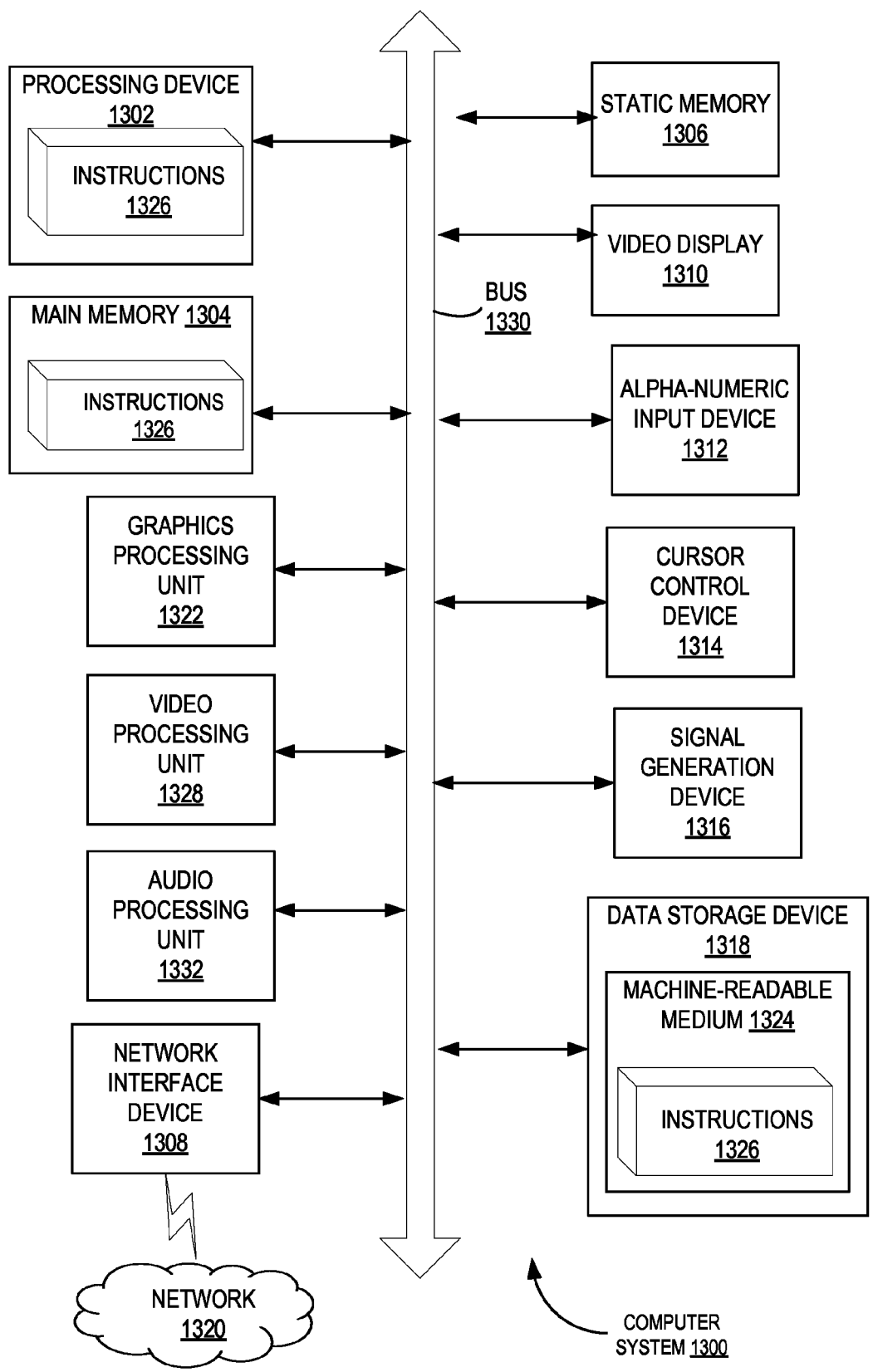
FIG. 13 illustrates a diagrammatic representation of a machine in the example form of a computer system within which a set of instructions, for causing the machine to perform any one or more of the methodologies discussed herein, may be executed.

FIG. 13 illustrates a diagrammatic representation of a machine in the example form of a computer system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the instructions 1326 (of a translation module) for performing the operations discussed herein.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computer system 1300 may include a graphics processing unit 1322, a video processing unit 1328, and an audio processing unit 1332. In another embodiment, the computer system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored instructions 1326 (of a translation module) embodying any one or more of the methodologies of functions described herein. The instructions 1326 may also reside, completely or at least partially, within the main memory 1304 and/or within the processing device 1302 during execution thereof by the computer system 1300; the main memory 1304 and the processing device 1302 also constituting computer-readable storage media.

The computer-readable storage medium 1324 may also be used to store instructions 1326 utilizing the translation module, such as described with respect to FIGS. 1-7, and/or a software library containing methods that call the above applications. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an apparatus comprising a memory module to store a plurality of instructions of an application and a processor communicatively coupled to the memory. The processor is to identify a first set of instructions from the plurality of instructions, wherein execution of the first set of instructions is to cause a first memory access violation, generate a second set of instructions, and replace the first set of instructions with the second set of instructions in the plurality of instructions. The processor is further to determine that execution of the second set of instructions is to cause a second memory access violation and replace the second set of instructions with the first set of instructions or generate a third set of instructions.

Example 2 may optionally extend the subject matter of example 1. In example 2, the processor identifies the first set of instructions by determining that a first instruction from the first set of instructions and a second instruction from the first set of instructions both access a same memory location and access mutually exclusive portions of the same memory location.

Example 3 may optionally extend the subject matter of examples 1-2. In example 3 the second set of instructions comprises at least one vector instruction.

Example 4 may optionally extend the subject matter of examples 1-3. In example 4 the processor identifies the first set of instructions by determining that a first instruction from the first set of instructions and a second instruction from the first set of instructions both access a same memory location and both access a same portion of the same memory location.

Example 5 may optionally extend the subject matter of examples 1-4. In example 5 the processor is to determine whether execution of the second set of instructions causes the second memory access violation by determining a first memory address for a first memory location of a first instruction of the second set of instructions and a second memory address for a second memory location of a second instruction of the second set of instructions and determining whether the first address matches the second address.

Example 6 may optionally extend the subject matter of examples 1-5. In example 6 the processor is further configured to determine whether execution of the third set of instructions causes a third memory access violation and when the execution of the third set of instructions causes the third memory access violation, replace the third set of instructions with the first set of instructions.

Example 7 may optionally extend the subject matter of examples 1-6. In example 6 the processor replaces the second set of instructions with the first set of instructions when a total number of memory access violations is greater than a threshold and wherein the processor or generates the third set of instructions when the total number of memory access violations is less than or equal to the threshold.

Example 8 may optionally extend the subject matter of examples 1-7. In example 8 the first set of instructions is atomic, the second set of instructions is atomic, and the third set of instructions is atomic.

Example 9 is a method comprising identifying a first set of instructions from a plurality of instructions, wherein execution of the first set of instructions causes a first memory access violation, generating a second set of instructions, and replacing the first set of instructions with the second set of instructions in the plurality of instructions. The method further comprises determining that execution of the second set of instructions causes a second memory access violation and replacing the second set of instructions with the first set of instructions or generating a third set of instructions.

Example 10 may optionally extend the subject matter of example 9. In example 10 identifying the first set of instructions comprises determining that a first instruction from the first set of instructions and a second instruction from the first set of instructions both access a same memory location and access mutually exclusive portions of the same memory location.

Example 11 may optionally extend the subject matter of examples 9-10. In example 11 the second set of instructions comprises at least one vector instruction.

Example 12 may optionally extend the subject matter of examples 9-11. In example 12 identifying the first set of instructions comprises determining that a first instruction from the first set of instructions and a second instruction from the first set of instructions both access a same memory location and both access a same portion of the same memory location.

Example 13 may optionally extend the subject matter of examples 9-12. In example 13 determining whether execution of the second set of instructions causes the second memory access violation comprises determining a first memory address for a first memory location of a first instruction of the second set of instructions and a second memory address for a second memory location of a second instruction of the second set of instructions and determining whether the first address matches the second address.

Example 14 may optionally extend the subject matter of examples 9-13. In example 14 the method further comprises determining whether execution of the third set of instructions causes a third memory access violation and when the execution of the third set of instructions causes the third memory access violation, replacing the third set of instructions with the first set of instructions.

Example 15 may optionally extend the subject matter of examples 9-14. In example 15 the second set of instructions is replaced with the first set of instructions when a total number of memory access violations is greater than a threshold and wherein the third set of instructions is generated when the total number of memory access violations is less than or equal to the threshold.

Example 16 may optionally extend the subject matter of examples 9-15. In example 16 the first set of instructions is atomic, the second set of instructions is atomic, and the third set of instructions is atomic.

Example 17 is a non-transitory machine-readable storage medium including data that, when accessed by a processor, cause the processor to perform operations. The operations comprise identifying a first set of instructions from a plurality of instructions, wherein execution of the first set of instructions causes a first memory access violation, generating a second set of instructions, and replacing the first set of instructions with the second set of instructions in the plurality of instructions. The operations further comprise determining that execution of the second set of instructions causes a second memory access violation and replacing the second set of instructions with the first set of instructions or generating a third set of instructions.

Example 18 may optionally extend the subject matter of example 17. In example 18 identifying the first set of instructions comprises determining that a first instruction from the first set of instructions and a second instruction from the first set of instructions both access a same memory location and access mutually exclusive portions of the same memory location.

Example 19 may optionally extend the subject matter of examples 17-18. In example 19 the second set of instructions comprises at least one vector instruction.

Example 20 may optionally extend the subject matter of examples 17-19. In example 20 identifying the first set of instructions comprises determining that a first instruction from the first set of instructions and a second instruction from the first set of instructions both access a same memory location and both access a same portion of the same memory location.

Example 21 may optionally extend the subject matter of examples 17-20. In example 21 determining whether execution of the second set of instructions causes the second memory access violation comprises determining a first memory address for a first memory location of a first instruction of the second set of instructions and a second memory address for a second memory location of a second instruction of the second set of instructions and determining whether the first address matches the second address.

Example 22 may optionally extend the subject matter of examples 17-21. In example 22 the operations further comprise determining whether execution of the third set of instructions causes a third memory access violation and when the execution of the third set of instructions causes the third memory access violation, replacing the third set of instructions with the first set of instructions.

Example 23 may optionally extend the subject matter of examples 17-22. In example 23 the second set of instructions is replaced with the first set of instructions when a total number of memory access violations is greater than a threshold and the third set of instructions is generated when the total number of memory access violations is less than or equal to the threshold.

Example 24 may optionally extend the subject matter of examples 17-23. In example 24 the first set of instructions is atomic, the second set of instructions is atomic, and the third set of instructions is atomic.

Example 25 is an apparatus comprising a means for storing a plurality of instructions of an application, means for identifying a first set of instructions from the plurality of instructions, wherein execution of the first set of instructions is to cause a first memory access violation, and means for generating a second set of instructions. The apparatus further comprises means for replacing the first set of instructions with the second set of instructions in the plurality of instructions, means for determining that execution of the second set of instructions is to cause a second memory access violation, and means for replacing the second set of instructions with the first set of instructions or generating a third set of instructions.

Example 26 may optionally extend the subject matter of example 25. In example 26 the apparatus further comprises when the second set of instructions causes the one or more memory access violations determining that a first instruction from the first set of instructions and a second instruction from the first set of instructions both access a same memory location and access mutually exclusive portions of the same memory location.

Example 27 may optionally extend the subject matter of examples 25-26. In example 27 the second set of instructions comprises at least one vector instruction.

Example 28 may optionally extend the subject matter of examples 25-27. In example 28 the apparatus further comprises means for determining that a first instruction from the first set of instructions and a second instruction from the first set of instructions both access a same memory location and both access a same portion of the same memory location.

Example 29 may optionally extend the subject matter of examples 25-28. In example 29 the apparatus further comprises means for determining a first memory address for a first memory location of a first instruction of the second set of instructions and a second memory address for a second memory location of a second instruction of the second set of instructions and means for determining whether the first address matches the second address.

Example 30 may optionally extend the subject matter of examples 25-29. In example 30 the apparatus further comprises means for determining whether execution of the third set of instructions causes a third memory access violation and means for replacing the third set of instructions with the first set of instructions when the execution of the third set of instructions causes the third memory access violation.

Example 31 may optionally extend the subject matter of examples 25-30. In example 31 the second set of instructions is replaced with the first set of instructions when a total number of memory access violations is greater than a threshold and the third set of instructions is generated when the total number of memory access violations is less than or equal to the threshold.

Example 32 may optionally extend the subject matter of examples 25-31. In example 32 the first set of instructions is atomic, the second set of instructions is atomic, and the third set of instructions is atomic.

Example 33 is a least one machine readable medium comprising a plurality of instructions that in response to being executed on a computing device, cause the computing device to carry out a method according to any one of examples 9-16.

Example 34 is an apparatus comprising means for performing the method of any one of examples 9-16.

Example 35 is a system comprising a processor communicatively coupled to a memory. The processor is to identify a first set of instructions from a plurality of instructions in the memory, wherein execution of the first set of instructions is to cause a first memory access violation, generate a second set of instructions, replace the first set of instructions with the second set of instructions in the plurality of instructions, determine that execution of the second set of instructions is to cause a second memory access violation, and replace the second set of instructions with the first set of instructions or generate a third set of instructions.

Example 36 may optionally extend the subject matter of example 35. In example 36 the processor identifies the first set of instructions by determining that a first instruction from the first set of instructions and a second instruction from the first set of instructions both access a same memory location and access mutually exclusive portions of the same memory location.

Example 37 may optionally extend the subject matter of examples 35-36. In example 37, the second set of instructions comprises at least one vector instruction.

Example 38 may optionally extend the subject matter of examples 35-37. In example 38, the processor identifies the first set of instructions by determining that a first instruction from the first set of instructions and a second instruction from the first set of instructions both access a same memory location and both access a same portion of the same memory location.

Example 39 may optionally extend the subject matter of examples 35-38. In example 39, the processor is to determine whether execution of the second set of instructions causes the second memory access violation by determining a first memory address for a first memory location of a first instruction of the second set of instructions and a second memory address for a second memory location of a second instruction of the second set of instructions, and determining whether the first address matches the second address.

Example 40 may optionally extend the subject matter of examples 35-39. In example 40, the processor is further configured to determine whether execution of the third set of instructions causes a third memory access violation, and when the execution of the third set of instructions causes the third memory access violation, replace the third set of instructions with the first set of instructions.

Example 41 may optionally extend the subject matter of examples 35-40. In example 41, the processor replaces the second set of instructions with the first set of instructions when a total number of memory access violations is greater than a threshold and wherein the processor generates the third set of instructions when the total number of memory access violations is less than or equal to the threshold.

Example 42 may optionally extend the subject matter of examples 35-41. In example 42, the second set of instructions is atomic, and wherein the third set of instructions is atomic.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "generating," "replacing," "determining," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:
  a memory module to store a plurality of instructions of an application;
  a processor communicatively coupled to the memory, the processor to:
    identify a first set of instructions from the plurality of instructions, wherein execution of the first set of instructions is to cause a first out-of-order execution fault;
    generate a second set of instructions comprising a first instruction and a second instruction from the first set of instructions, wherein the first instruction and the second instruction have a different order in the second set of instruction than in the first set of instructions;
    replace the first set of instructions with the second set of instructions at a same location in the plurality of instructions as the first set of instructions;
    determine that the order of the first instruction in the second set of instructions is to cause a second out-of-order execution fault;
    generate a third set of instruction comprising the second set of instructions, wherein the first instruction in the second set of instructions is reordered to be in the same order as the first instruction was in the first instruction set; and
    replace the second set of instructions with the third set of instructions.

2. The apparatus of claim 1, wherein the processor identifies the first set of instructions to cause the first out-of-order execution fault by determining that a first instruction from the first set of instructions and a second instruction from the first set of instructions both access a same memory location and access mutually exclusive portions of the same memory location.

3. The apparatus of claim 1, wherein the second set of instructions comprises at least one vector instruction.

4. The apparatus of claim 1, wherein the processor identifies the first set of instructions to cause the first out-of-order execution fault by determining that a first instruction from the first set of instructions and a second instruction from the first set of instructions both access a same memory location and both access a same portion of the same memory location.

5. The apparatus of claim 1, wherein the processor is to:
  determine a first memory address for a first memory location of a first instruction of the second set of instructions and a second memory address for a second memory location of a second instruction of the second set of instructions; and
  determine whether the first address matches the second address.

6. The apparatus of claim 1, wherein the processor is further configured to:
  determine whether execution of the third set of instructions causes a third out-of-order execution fault; and
  when the execution of the third set of instructions causes the third out-of-order execution fault, replace the third set of instructions with the first set of instructions.

7. The apparatus of claim 1, wherein the processor generates the third set of instructions when a total number of out-of-order execution faults is less than or equal to a threshold.

8. The apparatus of claim 1, wherein:
  the first set of instructions is atomic,
  the second set of instructions is atomic, and
  the third set of instructions is atomic.

9. A method comprising:
  identifying a first set of instructions from a plurality of instructions, wherein execution of the first set of instructions causes a first out-of-order execution fault;
  generating a second set of instructions comprising a first instruction and a second instruction from the first set of instructions, wherein the first instruction and the second instruction have a different order in the second set of instruction than in the first set of instructions;
  replacing the first set of instructions with the second set of instructions at a same location in the plurality of instructions as the first set of instructions;
  determining that the order of the first instruction in the second set of instructions causes a second out-of-order execution fault;
  generate a third set of instructions comprising the second set of instructions, wherein the first instruction in the second set of instructions is reordered to be in the same order as the first instruction was in the first instruction set; and
  replacing the second set of instructions with the third set of instructions.

10. The method of claim 9, wherein identifying the first set of instructions causing the first out-of-order execution fault comprises determining that a first instruction from the first set of instructions and a second instruction from the first set of instructions both access a same memory location and access mutually exclusive portions of the same memory location.

11. The method of claim 9, wherein the second set of instructions comprises at least one vector instruction.

12. The method of claim 9, wherein identifying the first set of instructions causing the first out-of-order execution fault comprises determining that a first instruction from the first set of instructions and a second instruction from the first set of instructions both access a same memory location and both access a same portion of the same memory location.

13. The method of claim 9, further comprising:
  determining a first memory address for a first memory location of a first instruction of the second set of instructions and a second memory address for a second memory location of a second instruction of the second set of instructions; and
  determining whether the first address matches the second address.

14. The method of claim 9, further comprising:
  determining whether execution of the third set of instructions causes a third out-of-order execution fault; and when the execution of the third set of instructions causes the third out-of-order execution fault, replacing the third set of instructions with the first set of instructions.

15. The method of claim 9, wherein the third set of instructions is generated when a total number of out-of-order execution faults is less than or equal to a threshold.

16. The method of claim 9, wherein:
the first set of instructions is atomic,
the second set of instructions is atomic, and
the third set of instructions is atomic.

17. A system comprising:
a processor communicatively coupled to a memory, the processor to:
identify a first set of instructions from a plurality of instructions in the memory, wherein execution of the first set of instructions is to cause a first out-of-order execution fault;
generate a second set of instructions comprising a first instruction and a second instruction from the first set of instructions, wherein the first instruction and the second instruction have a different order in the second set of instruction than in the first set of instructions;
replace the first set of instructions with the second set of instructions at a same location in the plurality of instructions as the first set of instructions;
determine that the order of the first instruction in the second set of instructions is to cause a second out-of-order execution fault;
generate a third set of instructions comprising the second set of instructions, wherein the first instruction in the second set of instructions is reordered to be in the same order as the first instruction was in the first instruction set; and
replace the second set of instructions with the third set of instructions.

18. The system of claim 17, wherein the processor identifies the first set of instructions to cause the first out-of-order execution fault by determining that a first instruction from the first set of instructions and a second instruction from the first set of instructions both access a same memory location and access mutually exclusive portions of the same memory location.

19. The system of claim 17, wherein the second set of instructions comprises at least one vector instruction.

20. The system of claim 17, wherein the processor identifies the first set of instructions to cause the first out-of-order execution fault by determining that a first instruction from the first set of instructions and a second instruction from the first set of instructions both access a same memory location and both access a same portion of the same memory location.

21. The system of claim 17, wherein the processor is to:
determine a first memory address for a first memory location of a first instruction of the second set of instructions and a second memory address for a second memory location of a second instruction of the second set of instructions; and
determine whether the first address matches the second address.

22. The system of claim 17, wherein the processor is further configured to:
determine whether execution of the third set of instructions causes a third out-of-order execution fault; and
when the execution of the third set of instructions causes the third out-of-order execution fault, replace the third set of instructions with the first set of instructions.

23. The system of claim 17, wherein the processor generates the third set of instructions when a total number of out-of-order execution faults is less than or equal to the threshold.

24. The system of claim 17, wherein:
the first set of instructions is atomic,
the second set of instructions is atomic, and
the third set of instructions is atomic.

* * * * *